(12) United States Patent
Rice et al.

(10) Patent No.: US 11,518,346 B2
(45) Date of Patent: Dec. 6, 2022

(54) VEHICLE SENSOR CLEANING SYSTEMS

(71) Applicant: UATC, LLC, San Francisco, CA (US)

(72) Inventors: Wesly Mason Rice, Glenshaw, PA (US); Owen Watt, Pittsburgh, PA (US); Douglass Zhong, Pittsburgh, PA (US); Robert Kip Terhune, Pittsburgh, PA (US); Andrew Joseph Chellman, Glenshaw, PA (US); Aaron Gregory Burton, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 175 days.

(21) Appl. No.: 16/860,393

(22) Filed: Apr. 28, 2020

(65) Prior Publication Data

US 2021/0309186 A1 Oct. 7, 2021

Related U.S. Application Data

(60) Provisional application No. 63/003,981, filed on Apr. 2, 2020.

(51) Int. Cl.
 *B60S 1/56* (2006.01)
 *B60S 1/52* (2006.01)
 (Continued)

(52) U.S. Cl.
 CPC ............ *B60S 1/56* (2013.01); *B08B 3/024* (2013.01); *B08B 5/02* (2013.01); *B60S 1/52* (2013.01);
 (Continued)

(58) Field of Classification Search
 None
 See application file for complete search history.

(56) References Cited

U.S. PATENT DOCUMENTS 3,973,592 A * 8/1976 Cleaver ............... F16K 11/0833
 137/625.46
5,071,315 A * 12/1991 Kiyama ................. F04D 5/002
 415/144

(Continued)

FOREIGN PATENT DOCUMENTS

| DE | 112018001568 | 12/2019 |
| EP | 2949521 | 12/2015 |
| WO | WO 2016/004936 | 1/2016 |

OTHER PUBLICATIONS

International Search Report and Written Opinion for Application No. PCT/US2021/025316, dated Aug. 17, 2021, 18 pages.

*Primary Examiner* — Spencer E. Bell
*Assistant Examiner* — Omair Chaudhri
(74) *Attorney, Agent, or Firm* — Dority & Manning, P.A.

(57) ABSTRACT

Systems, devices, and methods for cleaning a sensor are provided. A sensor can include a housing. The housing can include a curved lens. The sensor can further include an inlet configured to receive a pressurized fluid. The sensor can further include a rotatable fluid distributor positioned within the housing. The rotatable fluid distributor can be configured to receive the pressurized fluid from the inlet. The sensor can further include a plurality of nozzles positioned around an exterior of the housing. Each of the plurality of nozzles can be configured to direct a flow of the pressurized fluid onto at least a portion of the curved lens. When the pressurized fluid is provided to the inlet, the rotatable fluid distributor can be configured to receive the pressurized fluid from the inlet and distribute the pressurized fluid to only a subset of the plurality of nozzles at any time.

18 Claims, 7 Drawing Sheets

(51) Int. Cl.
   *B60S 1/54*       (2006.01)
   *G02B 27/00*      (2006.01)
   *B08B 3/02*       (2006.01)
   *B08B 5/02*       (2006.01)
   *G05D 1/02*       (2020.01)

(52) U.S. Cl.
   CPC ............ *B60S 1/54* (2013.01); *G02B 27/0006* (2013.01); *G05D 1/021* (2013.01); *G05D 2201/0213* (2013.01)

(56) References Cited

U.S. PATENT DOCUMENTS

| | | | |
|---|---|---|---|
| 6,470,527 B1* | 10/2002 | Boncoglu | B60S 1/50 15/250.04 |
| 6,607,606 B2 | 8/2003 | Bronson | |
| 9,774,768 B1* | 9/2017 | Wojdacki, Jr. | G02B 27/0006 |
| 10,065,610 B2* | 9/2018 | Wakatsuki | B08B 1/005 |
| 2002/0005440 A1 | 1/2002 | Holt et al. | |
| 2005/0040674 A1* | 2/2005 | Vanlterson | B60S 1/52 296/192 |
| 2013/0256326 A1* | 10/2013 | Gorecki | B60S 1/50 220/746 |
| 2014/0036132 A1 | 2/2014 | Pawlowski | |
| 2016/0363036 A1* | 12/2016 | Imasaka | F01P 7/14 |
| 2017/0136474 A1* | 5/2017 | Alexander | B05B 3/02 |
| 2017/0146639 A1 | 5/2017 | Carothers | |
| 2018/0015907 A1 | 1/2018 | Rice | |
| 2018/0141544 A1* | 5/2018 | Xiao | G05D 1/0212 |
| 2018/0265049 A1 | 9/2018 | Schmidt et al. | |
| 2018/0272997 A1 | 9/2018 | Swain | |
| 2019/0136988 A1* | 5/2019 | Mizuno | B60S 1/481 |
| 2019/0184942 A1* | 6/2019 | Vaishnav | G01S 7/4813 |
| 2019/0314865 A1 | 10/2019 | Sevak et al. | |
| 2020/0114881 A1* | 4/2020 | Yamauchi | B60S 1/528 |
| 2020/0298804 A1* | 9/2020 | Sykula | B60S 1/56 |
| 2020/0398796 A1 | 12/2020 | Zimmer et al. | |
| 2021/0061237 A1* | 3/2021 | Krishnan | B60S 1/62 |
| 2021/0219811 A1* | 7/2021 | Horn | A47L 15/22 |

\* cited by examiner

VEHICLE SENSOR CLEANING SYSTEMS

PRIORITY CLAIM

The present application is based on and claims benefit of U.S. Provisional Application 63/003,981 having a filing date of Apr. 2, 2020, which is incorporated by reference herein.

FIELD

The present disclosure relates generally to devices, systems, and methods for cleaning autonomous vehicle sensors.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a sensor. The sensor can include a housing. The housing can include a curved lens. The sensor can further include an inlet configured to receive a pressurized fluid. The sensor can further include a rotatable fluid distributor positioned within the housing. The rotatable fluid distributor can be configured to receive the pressurized fluid from the inlet. The sensor can further include a plurality of nozzles positioned around an exterior of the housing. Each of the plurality of nozzles can be configured to direct a flow of the pressurized fluid onto at least a portion of the curved lens. When the pressurized fluid is provided to the inlet, the rotatable fluid distributor can be configured to receive the pressurized fluid from the inlet and distribute the pressurized fluid to only a subset of the plurality of nozzles at any time.

Another example aspect is directed to a sensor cleaning system. The sensor cleaning system can include a pressurized fluid source and a sensor. The sensor can include a housing. The housing can include a curved lens. The sensor can further include an inlet configured to receive a pressurized fluid. The sensor can further include a rotatable fluid distributor positioned within the housing. The rotatable fluid distributor can be configured to receive the pressurized fluid from the inlet. The sensor can further include a plurality of nozzles positioned around an exterior of the housing. Each of the plurality of nozzles can be configured to direct a flow of the pressurized fluid onto at least a portion of the curved lens. When the pressurized fluid is provided to the inlet, the rotatable fluid distributor can be configured to receive the pressurized fluid from the inlet and distribute the pressurized fluid to only a subset of the plurality of nozzles at any time.

Another example aspect is directed to an autonomous vehicle. The autonomous vehicle can include a pressurized fluid source and a sensor. The sensor can include a housing. The housing can include a curved lens. The sensor can further include an inlet configured to receive a pressurized fluid. The sensor can further include a rotatable fluid distributor positioned within the housing. The rotatable fluid distributor can be configured to receive the pressurized fluid from the inlet. The sensor can further include a plurality of nozzles positioned around an exterior of the housing. Each of the plurality of nozzles can be configured to direct a flow of the pressurized fluid onto at least a portion of the curved lens. When the pressurized fluid is provided to the inlet, the rotatable fluid distributor can be configured to receive the pressurized fluid from the inlet and distribute the pressurized fluid to only a subset of the plurality of nozzles at any time.

Other aspects of the present disclosure are directed to various systems, apparatuses, non-transitory computer-readable media, vehicles, and computing devices.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
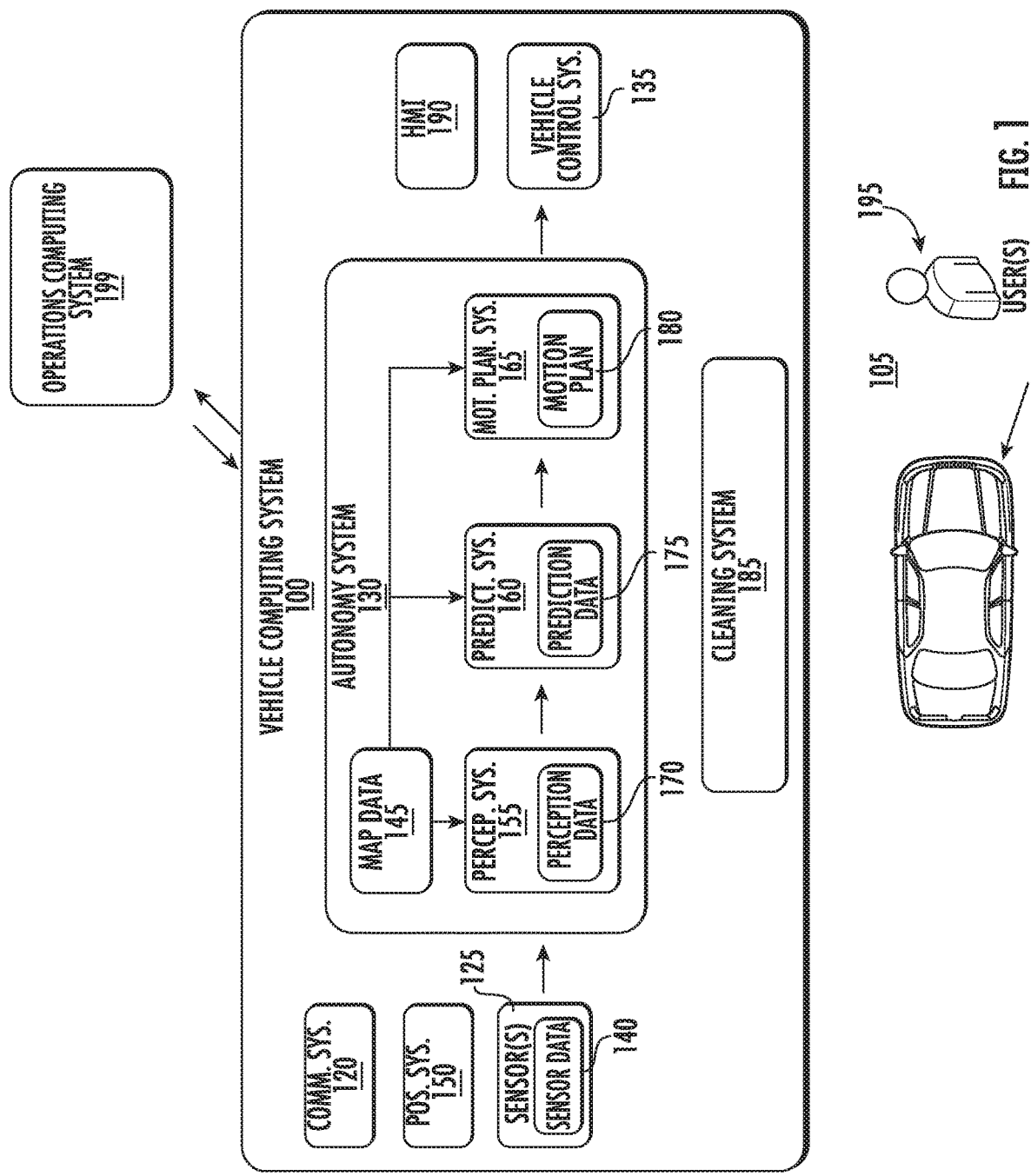
FIG. 1 depicts a block diagram of an example autonomous vehicle according to example aspects of the present disclosure.

Example aspects of the present disclosure are directed to sensors and sensor cleaning systems for an autonomous vehicle. For example, a sensor according to example aspects of the present disclosure can include a housing. In some implementations, the housing (or a portion thereof) can be a generally cylindrical housing. The housing can include a curved lens. For example, in some implementations, the curved lens (or a portion thereof) can be a cylindrical lens. The housing can also include a channel circumferentially positioned around a base of the housing. A rotatable disc can be positioned within the channel. The rotatable disc can be configured to rotate around at least a portion of the housing within the channel. For example, in some implementations, the rotatable disc can continuously rotate (e.g., orbit) the housing in a particular direction (e.g., clockwise or counterclockwise). The sensor can further include a plurality of nozzles positioned on the rotatable disc. The sensor can further include an inlet configured to receive a pressurized fluid. For example, in some implementations, the pressurized fluid can be a pressurized gas (e.g., air, etc.), or a pressurized liquid (e.g., water, cleaning solution, etc.). The sensor can include one or more fluid distribution ducts configured to direct the pressurized fluid from the inlet to the rotatable disc. When a pressurized fluid is provided to the inlet, the pressurized fluid can be configured to flow from the inlet through the one or more fluid distribution channels to the rotatable disc. The rotatable disc can be configured to direct the pressurized fluid on to at least a portion of the curved lens via the plurality of nozzles, thereby causing the rotatable disc to rotate around at least the portion of the housing. For example, in some implementations, the rotatable disc can continuously rotate (e.g., spin, orbit, etc.) around the housing to blow the pressurized fluid onto the curved lens.

More particularly, in some implementations, an autonomous vehicle can include one or more sensors. For example, the one or more sensors of the autonomous vehicle can obtain sensor data associated with one or more objects within the surrounding environment of the autonomous vehicle. The autonomous vehicle can then analyze the sensor data to autonomously navigate through the surrounding environment. For example, in some implementations, a perception system can receive the sensor data and generate state data descriptive of the one or more objects, such as data describing the position, velocity, heading, acceleration, size, type, etc. for each object. The perception system can provide the state data indicative of the one or more objects to a prediction system, which can determine a predicted future state for each object perceived by the perception system. A motion planning system can determine a motion plan for the autonomous vehicle based on the objects within the surrounding environment, the predicted future states for the objects, and characteristics of the area in which the vehicle is travelling. A vehicle controller can control the motion of the autonomous vehicle based on the motion plan. In this way, an autonomous vehicle can perceive objects within a surrounding environment of autonomous vehicle, and, in response, control the autonomous vehicle accordingly.

The sensors can be, for example, Light Detection and Ranging (LIDAR) sensors (e.g., spinning LIDAR, solid state LIDAR, etc.), Radio Detection and Ranging (RADAR) sensors, one or more cameras (e.g., visible spectrum cameras, infrared cameras, 360 degree cameras, etc.), ultrasonic sensors, wheel encoders, steering angle encoders, positioning sensors (e.g., GPS sensors), inertial measurement units, motion sensors, and/or other types of image capturing devices and/or sensors.

In some implementations, the one or more sensors can be positioned on an exterior of the autonomous vehicle. For example, one or more LIDAR sensors can be positioned on top of the autonomous vehicle (e.g., on a roof), on the side of the autonomous vehicle (e.g., on a door, pillar, quarter panel, bumper edge, etc.), on an end portion of a vehicle (e.g., front and/or rear bumper, trunk, hood, etc.) and/or on other portions of an autonomous vehicle. The orientation of such sensors may cause unique cleaning issues. For example, a side-mounted LIDAR sensor may be more prone to collecting debris (e.g., dirt, mud, bugs, rain, snow, ice, etc.) on a forward-facing portion of the sensor due to the primarily forward-facing motion of the autonomous vehicle. Cleaning such sensors can be difficult due to, for example, constraints such as mounting hardware and/or available mounting locations, the position of power and/or data cables, and/or other reasons. Moreover, some sensors may have larger surface areas that require cleaning as compared to other sensors. For example, a cylindrical (e.g., 360 degree) lens of a LIDAR sensor may have 10 times (or more) surface area than a small camera lens. Additionally, the shape of the lens can cause additional cleaning issues, as curved surfaces can be more difficult to clean than flat surfaces.

The sensors and systems of the present disclosure, however, can allow for efficient cleaning of a variety of sensors, including sensors with curved lenses. For example, in some implementations, a sensor can include a housing, which can include a curved lens. For example, in some implementations, the housing can include a cylindrical portion, which can include a curved lens. (e.g., a 180-degree lens, a 360-degree lens, a cylindrical lens, a fisheye lens, etc.). For example, the lens can be positioned on an exterior portion of the sensor (e.g., a portion of the housing), and can allow for components of the sensor (e.g., camera imagers, RADAR components, LIDAR components, etc.) positioned within the housing to obtain sensor data via the lens.

According to example aspects of the present disclosure, in some implementations, the housing can further include a channel circumferentially positioned around a base of the housing. For example, the base of the housing can be used to mount the sensor to an autonomous vehicle, such as on an exterior portion of the autonomous vehicle. In some implementations, the base can be formed by mounting (e.g. affixing) a base plate to a bottom portion of a housing. In some implementations, the base plate can be constructed out of aluminum, such as cast or milled aluminum. The channel can be formed by, for example, combining the base plate to the bottom portion of the housing. For example, in some implementations, the channel can be a "C" channel circumferentially positioned around base of the housing.

According to additional example aspects of the present disclosure, the rotatable disc can be positioned within the channel. For example, the rotatable disc can be located (e.g., positioned) at least partially on an exterior portion of the sensor. In some implementations, the rotatable disc can be constructed out of plastic, such as injection molded, cast, and/or machined plastic. The rotatable disc can be manufactured to a very low tolerance such that a very small gap exists between the rotatable disc and the channel. A plurality of nozzles can be positioned on the rotatable disc.

The sensor can further include an inlet configured to receive a pressurized fluid. For example, in some implementations, the inlet can be positioned in a center of a base plate. In some implementations, the inlet can be positioned off-center. One or more fluid distribution ducts can be configured to direct the pressurized fluid from the inlet to the rotatable disc. For example, in some implementations, a plurality of fluid distribution ducts can be radially positioned from the inlet (e.g. a centered inlet) and can extend from the inlet to the channel. In some implementations, a plurality of fluid distribution ducts can be symmetrically positioned within the housing. For example, two fluid distribution ducts can be positioned 180 degrees apart, three fluid distribution ducts can be positioned 120 degrees apart, etc.

When a pressurized fluid is provided to the inlet, the pressurized fluid can be configured to flow from the inlet through the one or more fluid distribution ducts to the rotatable disc. For example, the pressurized fluid can flow from the inlet through the one or more fluid distribution ducts to the channel. Once in the channel, the pressurized fluid can provide a lubricative effect to the rotatable disc. For example, due to the tight tolerance of the rotatable disc within the channel, minimal fluid leakage can occur, which can cause a cushion of fluid (e.g., air, liquid, etc.) to lift the rotatable disc off of the bottom portion of the channel (e.g., the base plate), thereby allowing the rotatable disc to glide within the channel as the pressurized fluid flows through the sensor.

According to additional aspects of the present disclosure, the pressurized fluid can then exit the rotatable disc via the plurality of nozzles. For example, each of the plurality of nozzles can be in fluid communication with the channel. Further, in some implementations, the plurality of nozzles can be positioned to direct the pressurized fluid onto a least a portion of the curved lens. As the pressurized fluid exits the plurality of nozzles, the force of the pressurized fluid exiting will impart an opposite force on the rotatable disc, thereby causing the rotatable disc to rotate around at least a portion of the housing (e.g. in a direction counter to the flow of the pressurized fluid).

In some implementations, one or more nozzles of the plurality can include one or more teardrop shaped nozzles. For example, the teardrop shape of the nozzles can increase the velocity of the pressurized fluid, which can improve the cleaning of the lens provided by the pressurized fluid.

In some implementations, the plurality of nozzles can include a plurality of subsets of nozzles. (e.g., a first subset and a second subset). Each subset can include one or more nozzles. The plurality of subsets of nozzles can be symmetrically balanced around the rotatable disc. For example, for two subsets of nozzles, the subsets can be positioned on opposite sides (e.g., 180 degrees) of the rotatable disc, whereas for three subsets of nozzles, the rotatable disc can be divided into thirds, with each subset positioned on the subset's respective third (e.g., 120 degrees apart). In some implementations, the plurality of nozzles can include, for example, 4-8 nozzles.

In some implementations, each of the plurality of nozzles can be housed in a respective retaining ring on the rotatable disc. For example, the retaining ring can be sized slightly smaller than the nozzle and can hold the nozzle in place as the pressurized fluid flows through the nozzle. Further, in some implementations, each of the plurality of nozzles can be configured to be independently movable within the respective retaining ring. For example, the retaining ring can be an eyeball shaped retaining ring, which can allow the nozzle to be positioned in a desired orientation.

In some implementations, the plurality of nozzles can include one or more nozzles angled in a first direction, and one or more nozzles angled in a second direction. For example, one or more nozzles can be angled in the first direction and can be configured to cause the rotatable disc to rotate when the pressurized fluid exits the nozzle. For example, in some implementations, the first angle can be approximately 70 degrees and the second angle can be approximately 110 degrees. As used herein, the term "approximately" when used in reference to an angle can mean within 15 degrees of the stated value.

For example, in some implementations, a subset of nozzles can include three nozzles. Two nozzles can be positioned at a first angle (e.g., parallel to one another to cause the rotatable disc to rotate clockwise), whereas a third nozzle can be angled in a second direction which is counter to the rotation of the rotatable disc (e.g., in a counter-clockwise direction). The two nozzles pointing in the first direction can be angled to direct the pressurized fluid onto at least a portion of the curved lens at the first angle. Further, the force of the pressurized fluid exiting the nozzles can cause the rotatable disc to rotate counter to the flow of the pressurized fluid. As the rotatable disc rotates around the housing, the flow of the pressurized fluid from the two nozzles can sweep across the curved lens to provide continuous cleaning. However, any obstructions on the exterior of the housing, such as data/power cable ports positioned on the housing, can cause a "blind spot" which blocks the flow from the two nozzles. The third nozzle angled at the second angle, however, can likewise be configured to direct a flow of the pressurized fluid onto the curved lens. Further, as the disc rotates, the third nozzle can back-sweep by directing the flow of the pressurized fluid onto at least a portion of the blind spot. The back-sweep can reduce the surface area of the blind spot and can be tuned by adjusting the angle of the third nozzle. Further, the force of the pressurized fluid exiting the third nozzle can cause a counter-rotational force, which can slow the rotational speed of the rotatable disc. In some implementations, the angle of the third nozzle can be selected to maximize, and in some implementations, optimize, the cleaning of the lens by, for example, reducing the area of any blind spots and/or slowing the rotation of the rotatable disc to improve the pressurized fluid flow density over the surface of the lens.

In some implementations, the rotatable disc can be configured to continuously rotate about the housing when the pressurized fluid is provided to the sensor. For example, the flow of the pressurized fluid through the nozzles can cause the rotatable disc to continuously rotate as the pressurized fluid flows through the sensor. For example, the rotatable disc can complete a plurality of rotations during the flow of the pressurized fluid.

In in some implementations, the rotatable disc can be configured to rotate about only a portion of the housing from an initial position "I" to a terminal position "T" when the pressurized fluid is provided to the sensor. For example, in some implementations, a curved lens may only cover a portion of a housing (e.g., 180 degrees), such as for a forward-facing sensor. In such an implementation, only half of the sensor housing (e.g., the lens portion) may require cleaning.

According to example aspects of the present disclosure, the sensor can further include a counter-rotator configured to return the rotatable disc from the terminal position "T" to the initial position "I." For example, in some implementations, the counter-rotator can include a spring. In various implementations, the spring can be, for example, a wound spring, torsion spring, extension spring, or other type of spring. In some implementations, the spring can be constructed out of metal, while in other implementations, the spring can be constructed out of any elastic material.

For example, when a pressurized fluid is provided to the sensor, the rotatable disc can rotate from an initial position around the sensor to a terminal position, as described herein. In some implementations, the amount of rotation can be controlled by varying the pressure of the pressurized fluid. Stated differently, the rotatable disc can be configured to rotate about the portion of the housing in relation to a pressure of the pressurized fluid provided to the inlet. For example, providing a first pressure (e.g., 70 psi) may cause the rotatable disc to rotate to an intermediate position (e.g., 30 degrees), while providing a second pressure (e.g., 90 psi) may cause the rotatable disc to rotate to the terminal position (e.g., 180 degrees). When the flow of the pressurized fluid is ceased (e.g., stopped) the counter-rotator can return the rotatable disc to the initial position. For example, a series of "pulses" of pressurized fluid can be provided to the sensor, wherein each pulse can cause the rotatable disc to rotate to clean the surface of the curved lens while the pressurized fluid is flowing before returning to the initial position for a subsequent pulse once the flow of the pressurized fluid is stopped.

In some implementations, the sensor can be included in a sensor cleaning system. For example, a sensor cleaning system can include a source of pressurized fluid. For example, in some implementations, the source of pressurized fluid can include a pressurized tank. In some implementations, the fluid can be provided to the pressurized tank from a fluid reservoir, and the pressurized tank can be pressurized by a gas, such as air from a compressor. In some implementations, the fluid can be pressurized at a pressure in a range of 70-90 psi. In some implementations, the fluid can be a gaseous fluid (e.g., air, etc.) or a liquid fluid (e.g., water, cleaning solution, etc.). In some implementations, the sensor cleaning system can include a flow control device (e.g., a valve, solenoid, etc.) in fluid communication with the source of pressurized fluid and the sensor. For example, the flow control device can be coupled between the source of pressurized fluid and the nozzle(s). The flow control device can be configured to allow or impede a flow of pressurized fluid from the source of pressurized fluid (e.g., a pressurized tank) to the nozzle(s). For example, in some implementations, the flow control device can be a valve or a solenoid. In some implementations, the sensor cleaning system can further include a controller configured to control operation of the flow control device. For example, the controller can be configured to open or close the flow control device to allow the pressurized fluid to flow from the source of pressurized fluid (e.g., a pressurized tank) to the nozzle(s) of a sensor. The nozzle(s) can receive the pressurized fluid and provide the pressurized fluid to a surface of the sensor, such as a curved lens, in order to delaminate debris from the sensor.

According to additional aspects of the present disclosure, in some implementations, a sensor can include a housing, which can include a curved lens. The sensor can further include an inlet configured to receive a pressurized fluid, as described herein. The sensor can also include a rotatable fluid distributor positioned within the housing. The rotatable fluid distributor can be configured to receive the pressurized fluid from the inlet. The sensor can further include a plurality of nozzles positioned around an exterior of the housing. For example, each of the plurality of nozzles can be configured to direct a flow of the pressurized fluid onto at least a portion of the curved lens. When the pressurized fluid is provided to the inlet, the rotatable fluid distributor can be configured to receive the pressurized fluid from the inlet, rotate within the housing, and distribute the pressurized fluid to only a subset of the plurality of nozzles at any time.

For example, in some implementations, the rotatable fluid distributor can be an internal rotatable disc. The internal rotatable disc can be configured to receive the pressurized fluid from the inlet and distribute the pressurized fluid to only a subset of the plurality of nozzles by rotating within the housing due to a flow of the pressurized fluid from the internal rotatable disc to the subset of the plurality of nozzles.

In some implementations, the internal rotatable disc can include a curved fluid duct configured to direct the flow of the pressurized fluid at least partially in a tangential direction to the internal rotatable disc. For example, the inlet can be positioned in a center portion of a baseplate, and the curved fluid duct can curve outwards from the center such that the end of the curved fluid duct directs the pressurized fluid at least partially tangentially from the internal rotatable disc.

In some implementations, the plurality of nozzles can be positioned around the exterior of the base (e.g., of a baseplate) of the housing. As the internal rotatable disc rotates within the housing due to the flow of the pressurized fluid, the pressurized fluid can be distributed to one or more portions of the base. Each of the one or more portions of the base can be configured to direct the flow of the pressurized fluid from the internal rotatable disc to one or more respective nozzles. For example, in one implementation, eight nozzles can be symmetrically positioned around an exterior of a base (e.g., baseplate) by positioning the nozzles every 45 degrees. Each nozzle can have a portion of the base corresponding to 45-degree arc which is configured to direct the pressurized fluid received from the internal rotatable disc to the corresponding nozzle. In some implementations, each respective portion of the base can include one or more fins. For example, the one or more fins of a respective portion can be configured to aid in directing the pressurized fluid to the respective nozzle.

In some implementations, the rotatable fluid distributor can include a rotating cam. For example, the rotating cam can be a spring-loaded rotating cam, which can be configured to rotate when the flow of the pressurized fluid is provided to the rotating cam and/or when the flow of the pressurized fluid to the rotating cam is ceased. The rotating cam can include, for example, a plurality of interconnected teeth corresponding to the number of nozzles positioned around the exterior of the sensor. As the flow of pressurized fluid is provided to the sensor, such as via a plurality of pulses, the teeth of the rotating cam can engage and/or disengage to rotate the rotating cam to sequential nozzles. For example, during an "on" portion of a pulse, the rotating cam can disengage the teeth and partially rotate to direct the flow of the pressurized fluid to a first nozzle (or nozzles). During an "off" portion of the pulse, the spring can cause the cam teeth to re-engage, which can partially rotate the cam to a second nozzle (or nozzles). The cycle can be repeated for a plurality of pulses to distribute the flow of the pressurized fluid to each sequential nozzle.

The sensors and cleaning systems according to example aspects of the present disclosure can provide any number of technical effects and benefits. For example, the sensors and systems of the present disclosure can allow for efficient cleaning of sensors with large surface areas. For example, each of the various implementations described herein can allow for a single flow control device to provide a flow of pressurized fluid to a plurality of nozzles, which can collectively clean a surface (e.g., a curved lens) of the sensor. For example, an external rotating disc can rotate a plurality of nozzles around the sensor to continuously clean the sensor. In some implementations, a counter-rotator can be incorporated to allow for targeted cleaning of a portion of a sensor (e.g., a curved lens). Similarly, an internal rotatable disc can distribute the flow of the pressurized fluid to a subset of external nozzles sequentially to clean the surface of the sensor. Likewise, a rotating cam can allow for targeted pulses to be used to clean individual portions of a sensor (e.g., a curved lens) in a sequential manner.

Further, the sensors and systems of the present disclosure can allow for a reduction in the complexity of a sensor cleaning system. For example, by leveraging a single flow control device (e.g., a single valve) to provide a pressurized fluid to a plurality of nozzles, fewer components can be used as compared to systems in which each nozzle has a corresponding flow control device. This reduced complexity can allow for lighter-weight cleaning systems due to the reduction of necessary components, as well as reducing associated maintenance requirements. Moreover, this can reduce the number of communication channels required to control operation of the cleaning system as compared to a system in which each nozzle requires an associated flow control device.

Additionally, the nozzles and systems according to example aspects of the present disclosure can allow for the efficient removal of debris from a sensor during operation of an autonomous vehicle, thereby enabling improved operation of the sensor. Improved performance of the sensor can lead to improved performance of the autonomous vehicle motion control, which relies upon data collected by the one or more sensors to comprehend the surrounding environment of the autonomous vehicle. Thus, the improved sensors and systems of the present disclosure can directly improve autonomous vehicle performance such as efficiency, safety, and passenger comfort.

With reference now to the FIGS., example aspects of the present disclosure will be discussed in further detail. FIG. 1 illustrates an example vehicle computing system 100 according to example aspects of the present disclosure. The vehicle computing system 100 can be associated with an autonomous vehicle 105. The vehicle computing system 100 can be located onboard (e.g., included on and/or within) the autonomous vehicle 105.

The autonomous vehicle 105 incorporating the vehicle computing system 100 can be various types of vehicles. For instance, the autonomous vehicle 105 can be a ground-based autonomous vehicle such as an autonomous car, autonomous truck, autonomous bus, autonomous bike, autonomous scooter, autonomous light electric vehicle (LEV), etc. The autonomous vehicle 105 can be an air-based autonomous vehicle (e.g., airplane, helicopter, or other aircraft) or other types of vehicles (e.g., watercraft, etc.). The autonomous vehicle 105 can drive, navigate, operate, etc. with minimal and/or no interaction from a human operator (e.g., driver). In some implementations, a human operator can be omitted from the autonomous vehicle 105 (and/or also omitted from remote control of the autonomous vehicle 105). In some implementations, a human operator can be included in the autonomous vehicle 105.

In some implementations, the autonomous vehicle 105 can be configured to operate in a plurality of operating modes. The autonomous vehicle 105 can be configured to operate in a fully autonomous (e.g., self-driving) operating mode in which the autonomous vehicle 105 is controllable without user input (e.g., can drive and navigate with no input from a human operator present in the autonomous vehicle 105 and/or remote from the autonomous vehicle 105). The autonomous vehicle 105 can operate in a semi-autonomous operating mode in which the autonomous vehicle 105 can operate with some input from a human operator present in the autonomous vehicle 105 (and/or a human operator that is remote from the autonomous vehicle 105). The autonomous vehicle 105 can enter into a manual operating mode in which the autonomous vehicle 105 is fully controllable by a human operator (e.g., human driver, pilot, etc.) and can be prohibited and/or disabled (e.g., temporary, permanently, etc.) from performing autonomous navigation (e.g., autonomous driving). In some implementations, the autonomous vehicle 105 can implement vehicle operating assistance technology (e.g., collision mitigation system, power assist steering, etc.) while in the manual operating mode to help assist the human operator of the autonomous vehicle 105.

The operating modes of the autonomous vehicle 105 can be stored in a memory onboard the autonomous vehicle 105. For example, the operating modes can be defined by an operating mode data structure (e.g., rule, list, table, etc.) that indicates one or more operating parameters for the autonomous vehicle 105, while in the particular operating mode. For example, an operating mode data structure can indicate that the autonomous vehicle 105 is to autonomously plan its motion when in the fully autonomous operating mode. The vehicle computing system 100 can access the memory when implementing an operating mode.

The operating mode of the autonomous vehicle 105 can be adjusted in a variety of manners. For example, the operating mode of the autonomous vehicle 105 can be selected remotely, off-board the autonomous vehicle 105. For example, a remote computing system (e.g., of a vehicle provider and/or service entity associated with the autonomous vehicle 105) can communicate data to the autonomous vehicle 105 instructing the autonomous vehicle 105 to enter into, exit from, maintain, etc. an operating mode. By way of example, such data can instruct the autonomous vehicle 105 to enter into the fully autonomous operating mode. In some implementations, the operating mode of the autonomous vehicle 105 can be set onboard and/or near the autonomous vehicle 105. For example, the vehicle computing system 100 can automatically determine when and where the autonomous vehicle 105 is to enter, change, maintain, etc. a particular operating mode (e.g., without user input). Additionally, or alternatively, the operating mode of the autonomous vehicle 105 can be manually selected via one or more interfaces located onboard the autonomous vehicle 105 (e.g., key switch, button, etc.) and/or associated with a computing device proximate to the autonomous vehicle 105 (e.g., a tablet operated by authorized personnel located near the autonomous vehicle 105). In some implementations, the operating mode of the autonomous vehicle 105 can be adjusted by manipulating a series of interfaces in a particular order to cause the autonomous vehicle 105 to enter into a particular operating mode.

The vehicle computing system 100 can include one or more computing devices located onboard the autonomous vehicle 105. For example, the computing device(s) can be located on and/or within the autonomous vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the autonomous vehicle 105 (e.g., its computing system, one or more processors, etc.) to perform operations and functions, such as those described herein for determining sensor degradation conditions and implementing sensor corrective actions, etc.

The autonomous vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the autonomous vehicle 105 over one or more networks (e.g., via one or more wireless signal connections). For example, the communications system 120 can allow the autonomous vehicle to communicate and receive data from an operations computing system 199 of a service entity. In some implementations, the communications system 120 can allow communication among one or more of the system(s) on-board the autonomous vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the autonomous vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the autonomous vehicle 105. For instance, the sensor data 140 can acquire image and/or other data within a field of view of one or more of the vehicle sensor(s) 125. The vehicle sensor(s) 125 can include a Light Detection and Ranging (LIDAR) system (e.g., spinning LIDAR, solid state LIDAR, etc.), a Radio Detection and Ranging (RADAR) system, one or more cameras (e.g., visible spectrum cameras, infrared cameras, etc.), ultrasonic sensors, wheel encoders, steering angle encoders, positioning sensors (e.g., GPS sensors), inertial measurement units, motion sensors, and/or other types of image capturing devices and/or sensors. The sensor data 140 can include image data, RADAR data, LIDAR data, and/or other data acquired by the vehicle sensor(s) 125. The autonomous vehicle 105 can include other sensors configured to acquire data associated with the autonomous vehicle 105. For example, the autonomous vehicle 105 can include inertial measurement unit(s) and/or other sensors.

In various implementations, the vehicle sensor(s) 125 can be positioned around an exterior of the vehicle 105. For example, in some implementations, one or more LIDAR sensors, RADAR sensors, camera sensors, etc. can be positioned on top of the autonomous vehicle (e.g., on a roof), on the side of the autonomous vehicle (e.g., on a door, pillar, quarter panel, bumper edge, etc.), on an end portion of a vehicle (e.g., front and/or rear bumper, trunk, hood, etc.) and/or on other portions of an autonomous vehicle. The orientation of such sensors 125 may cause unique cleaning issues. For example, a side-mounted LIDAR sensor may be more prone to collecting debris (e.g., dirt, mud, bugs, rain, snow, ice, etc.) on a forward-facing portion of the sensor 125 due to the primarily forward-facing motion of the autonomous vehicle. Cleaning such sensors 125 can be difficult due to, for example, constraints such as mounting hardware and/or available mounting locations, the position of power and/or data cables, and/or other reasons. Moreover, some sensors 125 may have larger surface areas that require cleaning as compared to other sensors 125. For example, a cylindrical (e.g., 360 degree) lens of a LIDAR sensor may have 10 times (or more) surface area than a small camera lens. Additionally, the shape of the lens can cause additional cleaning issues, as curved surfaces can be more difficult to clean than flat surfaces. As will be described in greater detail herein, the sensors and systems of the present disclosure can allow for improved effectiveness of cleaning such sensors.

In some implementations, the sensor data 140 can be indicative of one or more objects within the surrounding environment of the autonomous vehicle 105. The object(s) can include, for example, vehicles, pedestrians, bicycles, and/or other objects. The object(s) can be located in front of, to the rear of, to the side of the autonomous vehicle 105, etc. The sensor data 140 can be indicative of locations associated with the object(s) within the surrounding environment of the autonomous vehicle 105 at one or more times. The vehicle sensor(s) 125 can communicate (e.g., transmit, send, make available, etc.) the sensor data 140 to the autonomy computing system 130.

In addition to the sensor data 140, the autonomy computing system 130 can retrieve or otherwise obtain map data 145. The map data 145 can provide information about the surrounding environment of the autonomous vehicle 105. In some implementations, an autonomous vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the autonomous vehicle 105 in comprehending and perceiving its surrounding environment and its relationship thereto. In some implementations, the vehicle computing system 100 can determine a vehicle route for the autonomous vehicle 105 based at least in part on the map data 145.

The autonomous vehicle 105 can include a positioning system 150. The positioning system 150 can determine a current position of the autonomous vehicle 105. The positioning system 150 can be any device or circuitry for analyzing the position of the autonomous vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the autonomous vehicle 105 can be used by various systems of the vehicle computing system 100 and/or provided to a remote computing system. For example, the map data 145 can provide the autonomous vehicle 105 relative positions of the elements of a surrounding environment of the autonomous vehicle 105. The autonomous vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the autonomous vehicle 105 and determine a motion plan 180 for controlling the motion of the autonomous vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan 180 through such surrounding environment. The autonomy computing system 130 can communicate with the one or more vehicle control systems 135 to operate the autonomous vehicle 105 according to the motion plan 180.

The vehicle computing system 100 (e.g., the autonomy computing system 130) can identify one or more objects that are proximate to the autonomous vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the autonomous vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; a shape; a size/footprint (e.g., as represented by a bounding shape); a type/class (e.g., pedestrian class vs. vehicle class vs. bicycle class), a distance from the autonomous vehicle 105; the uncertainties associated therewith, and/or other state information. The perception system 155 can provide the perception data 170 to the prediction system 160, and/or the motion planning system 165.

The prediction system 160 can be configured to predict a motion of the object(s) within the surrounding environment of the autonomous vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the autonomous vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the autonomous vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the autonomous vehicle 105 can perform a certain action (e.g., pass an object, etc.) without increasing the potential risk to the autonomous vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the autonomous vehicle 105 (e.g., due to an overriding factor). In some implementations, the motion plan 180 may define the vehicle's motion such that the autonomous vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) 180 for the autonomous vehicle 105 (e.g., multiple times per second). Each new motion plan 180 can describe a motion of the autonomous vehicle 105 over the next planning period (e.g., next several seconds). Moreover, a new motion plan 180 may include a new planned vehicle motion trajectory. Thus, in some implementations, the motion planning system 165 can continuously operate to revise or otherwise generate a short-term motion plan based on the currently available data. Once the optimization planner has identified the optimal motion plan 180 (or some other iterative break occurs), the optimal motion plan 180 (and the planned motion trajectory) can be selected and executed by the autonomous vehicle 105.

The vehicle computing system 100 can cause the autonomous vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the autonomous vehicle 105. The vehicle control system(s) 135 can be associated with a vehicle controller (e.g., including a vehicle interface) that is configured to implement the motion plan 180. The vehicle controller can, for example, translate the motion plan 180 into instructions for the appropriate vehicle control component (e.g., acceleration control, brake control, steering control, etc.). By way of example, the vehicle controller can translate a determined motion plan 180 into instructions to adjust the steering of the autonomous vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the autonomous vehicle 105 to autonomously travel within the vehicle's surrounding environment.

The autonomous vehicle 105 can include an HMI ("Human Machine Interface") 190 that can output data for and accept input from a user 195 of the autonomous vehicle 105. The HMI 190 can include one or more output devices such as display devices, speakers, tactile devices, etc. For instance, the autonomous vehicle 105 can include a plurality of display devices. The display devices can include smart glass technology, a display screen, CRT, LCD, plasma screen, touch screen, TV, projector, other types of display devices and/or a combination thereof. One or more of the display devices can be included in a user device (e.g., personal computer, tablet, mobile phone, etc.).

The plurality of display devices can include a first display device and a second display device. The first display device can be associated with the exterior of the autonomous vehicle 105. The first display device can be located on an exterior surface and/or other structure, of the autonomous vehicle 105 and/or configured such that a user 195 can view and/or interact with the first display device (and/or a user interface rendered thereon) from the exterior of the autonomous vehicle 105. For example, one or more windows of the autonomous vehicle 105 can include smart glass technology that can perform as the first display device. The second display device can be associated with the interior of the autonomous vehicle 105. The second display device can be located on an interior surface and/or other structure (e.g., seat, etc.) of the autonomous vehicle 105 and/or configured such that a user can view and/or interact with the second display device (and/or a user interface rendered thereon) from the interior of the autonomous vehicle 105. For example, a user device (e.g., tablet, etc.) located within the interior of the autonomous vehicle 105 can include the second display device.

The autonomous vehicle 105 can further include a sensor cleaning system 185 configured to clean one or more sensors 125 of the autonomous vehicle 105. An example sensor cleaning system 185 will be discussed in greater detail with reference to FIG. 2.

The autonomous vehicle 105 can be associated with a variety of different parties. In some implementations, the autonomous vehicle 105 can be associated with a vehicle provider. The vehicle provider can include, for example, an owner, a manufacturer, a vendor, a manager, a coordinator, a handler, etc. of the autonomous vehicle 105. The vehicle provider can be an individual, a group of individuals, an entity (e.g., a company), a group of entities, a service entity, etc. In some implementations, the autonomous vehicle 105 can be included in a fleet of vehicles associated with the vehicle provider. The vehicle provider can utilize a vehicle provider computing system that is remote from the autonomous vehicle 105 to communicate (e.g., over one or more wireless communication channels) with the vehicle computing system 100 of the autonomous vehicle 105. The vehicle provider computing system can include a server system (e.g., of an entity), a user device (e.g., of an individual owner), and/or other types of computing systems.

The autonomous vehicle 105 can be configured to perform vehicle services for one or more service entities. An autonomous vehicle 105 can perform a vehicle service by, for example, travelling (e.g., traveling autonomously) to a location associated with a requested vehicle service, allowing user(s) 195 and/or item(s) to board or otherwise enter the autonomous vehicle 105, transporting the user(s) 195 and/or item(s), allowing the user(s) 195 and/or item(s) to deboard or otherwise exit the autonomous vehicle 105, etc. In this way, the autonomous vehicle 105 can provide the vehicle service(s) for a service entity to a user 195.

A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users 195. For example, a service entity can offer vehicle service(s) to users 195 via one or more software applications (e.g., that are downloaded onto a user computing device), via a website, and/or via other types of interfaces that allow a user 195 to request a vehicle service. As described herein, the vehicle services can include transportation services (e.g., by which a vehicle transports user(s) 195 from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services.

Each service entity can be associated with a respective telecommunications network system of that service entity. A telecommunications network system can include the infrastructure to facilitate communication between the autonomous vehicle 105 and the various computing systems of the associated service entity that are remote from the autonomous vehicle 105. For example, a service entity can utilize an operations computing system 199 to communicate with, coordinate, manage, etc. autonomous vehicle(s) to perform the vehicle services of the service entity. A telecommunications network system can allow an autonomous vehicle 105 to utilize the back-end functionality of the respective operations computing system 199 (e.g., service assignment allocation, vehicle technical support, etc.).

An operations computing system 199 can include one or more computing devices that are remote from the autonomous vehicle 105 (e.g., located off-board the autonomous vehicle 105). For example, such computing device(s) can be components of a cloud-based server system and/or other type of computing system that can communicate with the vehicle computing system 100 of the autonomous vehicle 105, another computing system (e.g., a vehicle provider computing system, etc.), a user device, etc. The operations computing system 199 can be or otherwise included in a data center for the service entity, for example. The operations computing system can be distributed across one or more location(s) and include one or more sub-systems. The computing device(s) of an operations computing system 199 can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system (e.g., the one or more processors, etc.) to perform operations and functions, such as communicating data to and/or obtaining data from vehicle(s), etc.

In some implementations, the operations computing system 199 and the vehicle computing system 100 can indirectly communicate. For example, a vehicle provider computing system can serve as an intermediary between the operations computing system and the vehicle computing system 100 such that at least some data is communicated from the operations computing system 199 (or the vehicle computing system 100) to the vehicle provider computing system and then to the vehicle computing system 100 (or the operations computing system 199).

Figure 2:
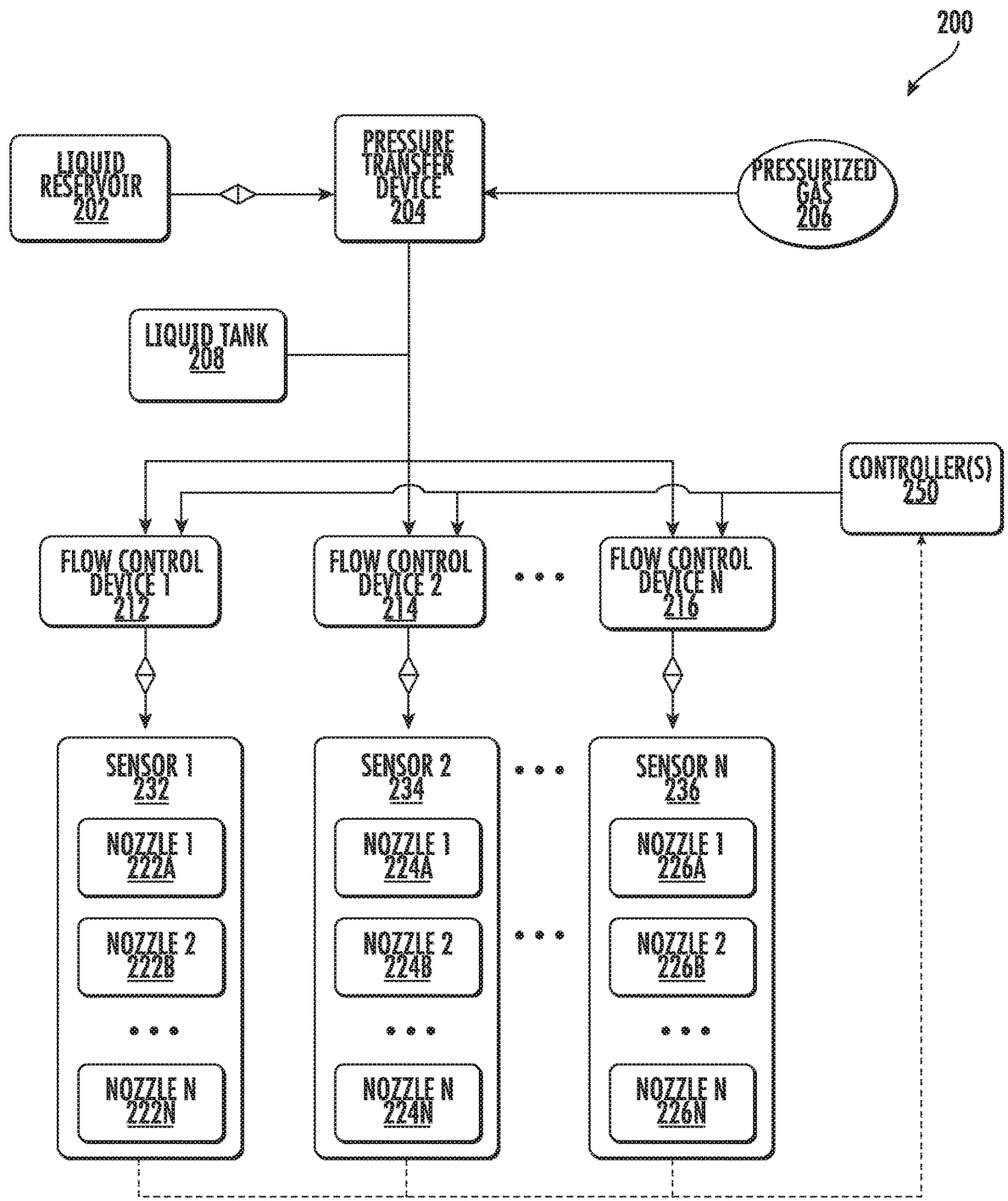
FIG. 2 depicts a block diagram of an example cleaning system according to example aspects of the present disclosure.

FIG. 2 depicts a block diagram of an example fluid-based (e.g., liquid, gas) sensor cleaning system 200 according to example embodiments of the present disclosure. The fluid-based sensor cleaning system 200 can be included in an autonomous vehicle 105 to clean the sensors 125 of the autonomous vehicle 105.

In particular, as shown, the system 200 is a pressurized-gas, liquid cleaning system 200. In various other implementations, the system 200 can be a hydraulic pressurized fluid cleaning system, such as liquid pressurized via one or more pumps. Further, in some implementations, the system 200 can be a pressurized gas cleaning system, wherein the cleaning fluid can be pressurized gas (e.g., compressed air), such as from a source of pressurized gas 206.

The fluid-based sensor cleaning system 200 of FIG. 2 includes a pressure transfer device 204. The pressure transfer device 204 can receive liquid from a liquid reservoir 202. For example, the liquid reservoir 202 can be a windshield washer reservoir of the autonomous vehicle. In some implementations, the liquid fluid can be windshield washer fluid, methanol, propylene glycol, antifreeze, ethanol, and/or other sensor cleaning liquid.

In some implementations, the pressure transfer device 204 can pull liquid from the liquid reservoir 202. For example, the pressure transfer device 204 can include an internal mechanism that operates to draw liquid from the liquid reservoir 202 to the pressure transfer device 204. In one example, such internal mechanism includes a biasing element (e.g., a mechanical spring) that biases a partition included in the pressure transfer device 204 toward increasing a volume of a liquid chamber in the device 204, thereby pulling liquid from the reservoir 202 to the device 204. In other implementations, the system 200 can include a pump (not illustrated) that actively pumps or pushes the liquid from the liquid reservoir 202 to the pressure transfer device 204. The pump can be controlled (e.g., by the one or more controllers 250) based on knowledge of an amount of liquid included in the pressure transfer device 204 and/or the liquid tank 208. For example, various sensors or other components can be used to monitor the amount of liquid included in the pressure transfer device 204 and/or the liquid tank 208. When additional liquid is desired, the pump is operated to pump liquid from the reservoir 202 to the pressure transfer device 204.

Referring still to FIG. 2, the pressure transfer device 204 can use pressurized gas 206 to pressurize the liquid received from the liquid reservoir 202. Liquid pressurized by the pressure transfer device can be stored in a liquid tank 208. For example, the liquid tank 208 can be a liquid accumulator. In some implementations, the liquid tank 208 and the pressure transfer device 204 can be integrated together into a single component. The liquid reservoir 202, pressure transfer device 204, pressurized gas 206, the liquid tank 208, a liquid pump (not shown), or any other suitable fluid source can be included in or otherwise form a part of a fluid source, pressurized fluid source, or source of pressurized fluid, as those terms are used herein. The components 202-208 shown in FIG. 2 are illustrative of one example fluid source, but one of ordinary skill in the art will recognize that any number of fluid sources can be used to provide a pressurized fluid in a cleaning system, as described herein.

In some implementations, the liquid reservoir 202, pressure transfer device 204, pressurized gas 206, the liquid tank 208, and/or any other fluid source can be a high-pressure fluid source. For example, in some implementations, the fluid stored in the liquid tank 208 and/or the pressurized gas 206 can be at a pressure between approximately 70 psi and 90 psi. Referring still to FIG. 2, the pressurized fluid provided by the pressure transfer device 204 and/or stored in the tank 208 can be respectively provided to a plurality of flow control devices 212, 214, and 216.

The fluid-based sensor cleaning system 200 can also include a plurality sensors 232, 234, and 236. Each of the sensors 232-236 can include a plurality of nozzles 222A-N, 224A-N, and 226A-N, respectively. The fluid-based sensor cleaning system 200 can also include the plurality of flow control devices, as shown at 212, 214, and 216. The flow control devices 212-216 can respectively control a flow of the pressurized fluid from the pressure transfer device 204 and/or the liquid tank 208 to the plurality of sensors 232-236 (and consequently to the respective plurality of nozzles 222A-N, 224A-N, and 226A-N). Although three sensors 232-236 are shown, the system 200 can include any number of sensors. Additionally, while three flow control devices 212 are shown, the system 200 can include any number of flow control devices 212-216. Further, while each sensor 232-236 is shown as including three corresponding nozzles 222A-N, 224A-N, and 226A-N respectively, each sensor 232-236 can include any number of nozzles.

Each nozzle 222A-N, 224A-N, and 226A-N can use the pressurized fluid (e.g., pressurized liquid, compressed air) to clean a respective sensor 232-236. The sensors 232-236 can correspond to, for example, individual sensors 125 depicted in FIG. 1. For example, each nozzle 222A-N, 224A-N, and 226A-N can spray or otherwise release the pressurized fluid onto the sensor (e.g., a lens, cover, housing, or other portion of the sensor) to remove contaminants or other debris from the sensor (e.g., from the lens, cover, housing, or other portion of the sensor). In some implementations, one or more of the nozzles 222A-N, 224A-N, and 226A-N can include a nozzle that sprays the pressurized fluid onto the sensor 232-236 to clean the sensor 232-236. In some implementations, each nozzle 222A-N, 224A-N, and 226A-N can be integral to the corresponding sensor 232-236.

The sensor cleaning system 200 can further include one or more controllers 250 (also referred to as a computing device). The one or more controllers 250 can individually control each flow control device 212-216 to allow the flow of the pressurized fluid to the corresponding nozzle 222-226 to enable the corresponding nozzle 222-226 to individually clean the corresponding sensor 232-236.

The one or more controllers 250 can include one or more control devices, nozzles, or components that interface with or otherwise control the one or more flow control devices 212-216. As examples, a controller 250 can include one or more chips (e.g., ASIC or FPGA), expansion cards, and/or electronic circuitry (e.g., amplifiers, transistors, capacitors, etc.) that are organized or otherwise configured to control one or more flow control devices (e.g., by way of control signals). In some implementations, a controller 250 can include a processor that loads and executes instructions stored in a computer-readable media to perform operations.

In some implementations, the one or more controllers 250 include a single controller. In some implementations, the one or more controllers 250 include a plurality of controllers that respectively control the plurality of flow control devices 212-216. In some implementations, the one or more controllers 250 can be physically located on a control board. For example, the control board can be physically coupled to a flow control device manifold, as described below.

In some implementations, the plurality of flow control devices 212-216 can include a plurality of solenoids that are individually controllable by the one or more controllers 250 to respectively allow or impede the flow of the pressurized fluid to the corresponding sensor 232-236. That is, the one or more controllers 250 can individually control each solenoid to control the respective flow of liquid to the corresponding sensor 232-236, thereby enabling cleaning of each sensor 232-236, as described herein.

In some implementations, one or more of the flow control device manifolds (e.g., solenoid manifolds) can be integrated with the liquid tank 208. As an example, a solenoid manifold that controls the respective flow of the pressurized fluid to the sensors 232-236 can be physically located within a pressurized volume of the fluid stored by a liquid tank 208. In some implementations, the one or more controllers 250 can also be integrated with the liquid tank 208.

Inclusion of the flow control device manifold within the liquid tank 208 enables such components to be provided as a single package, thereby saving space. Inclusion of the flow control device manifold within the liquid tank 208 also decreases the respective fluid flow distances from the tank 208 to the sensors 232-236, thereby eliminating pressure loss due to hose length and, conversely, increasing pressure of the fluid when used by the sensors 232-236.

In addition, in some implementations, the integrated liquid tank can further include valves, a pressure sensor, and/or controls coupled thereto or otherwise integrated therewith.

In some implementations, an entirety of the sensor cleaning system 200 exclusive of wiring is physically located external to a cab of the autonomous vehicle. As one example, all system components except for the liquid reservoir 202 can be located on the roof of the vehicle (e.g., in the pod mounted on the roof of the vehicle). For example, the liquid reservoir 202 can be located under a hood of the vehicle. In addition, in some implementations, the entirety of the sensor cleaning system 200 inclusive of wiring is physically located external to the cab of the autonomous vehicle. In some implementations, some or all components of the sensor cleaning system 200 can be included within a cab of the vehicle.

In some implementations, the sensor cleaning system 200 can further include a controller area network. For example, the one or more controllers 250 can transmit control signals on the controller area network to control the plurality of flow control devices 212-216. Use of a controller area network by the sensor cleaning system 200 contrasts with the more typical use of a local interconnect network in vehicular applications. Use of a controller area network enables use a message broadcast and renders the sensor cleaning system 200 infinitely scalable from a communications perspective.

As one example, in some implementations, at least two or more of the flow control devices 212-216 can be integrated into the liquid tank 208, as described above. The integrated tank can include a number of connection pins that receive control signals from the controller area network. In some implementations, the control signals that control the flow control devices 212-216 can include a sequence signal and a firing order signal that instruct the integrated tank how to control the corresponding flow control devices 212-216. In one example, the integrated tank can have four connection pins that respectively correspond to power, ground, sequence, and firing order.

An advantage provided by the example cleaning systems 200 of the present disclosure is the ability to use a pressurized fluid to clean one or more sensors 232-236 of an autonomous vehicle 105 (e.g., by delaminating debris from the sensors 232-236).

Figure 3:
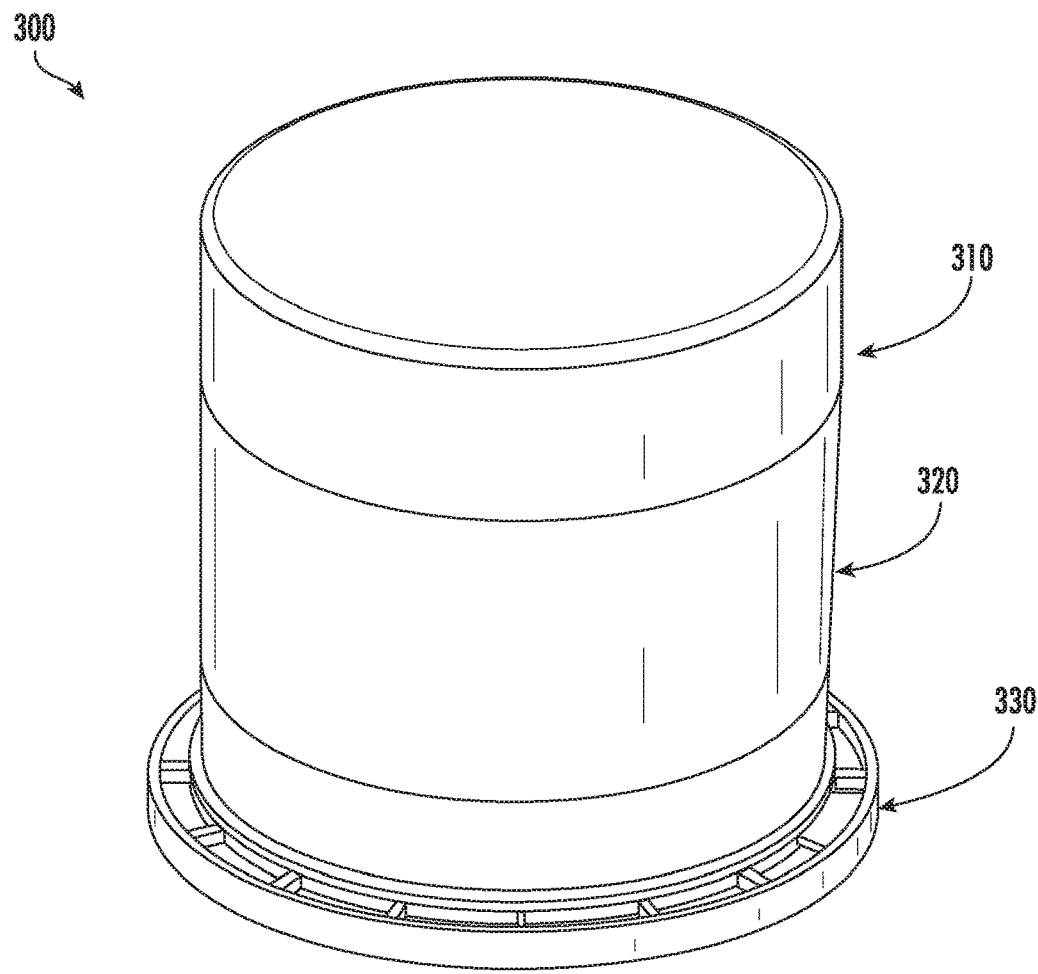
FIG. 3 depicts an example sensor according to example aspects of the present disclosure.

Referring now to FIG. 3, an example sensor 300 according to example aspects of the present disclosure is depicted. The sensor 300 can include a housing 310. For example, in some implementations, the housing 310 can be generally cylindrical. The housing 310 can be on an exterior portion of the sensor 300. In some implementations, one or more sensor components can be contained within the housing 310. For example, LIDAR components (e.g., spinning LIDAR, solid-state LIDAR) can be contained within the housing 310.

In some implementations, the housing 310 can include a curved lens 320. The curved lens 320 can wrap around at least a portion of the housing 310. For example, in some implementations, the curved lens 320 can be a generally cylindrical lens.

The housing 310 can be configured to be mounted on a vehicle, such as an autonomous vehicle 105 depicted in FIG. 1. For example, in various implementations, the housing 310 can include various mounting components (e.g., plates, brackets, mechanical fastener sockets, etc.) to allow for the housing 310 to be mounted on an exterior portion of the vehicle. In some implementations, the housing can include one or more data and/or power ports (not shown). For example, in some implementations, one or more data and/or power ports can be positioned between a curved lens 320 and a base portion of the housing 310.

According to example aspects of the present disclosure, in some implementations, the housing 310 can include a channel circumferentially positioned around a base of the housing 310. For example, the base of the housing 310 can be configured to be mounted to a vehicle, and the base can include a channel circumferentially positioned around the base of the housing 310.

In some implementations, a rotatable disc 330 can be positioned within the channel. The rotatable disc 330 can be configured to rotate around at least a portion of the housing 310 within the channel. An example channel configuration will be discussed in greater detail with respect to FIG. 5.

Figure 4:
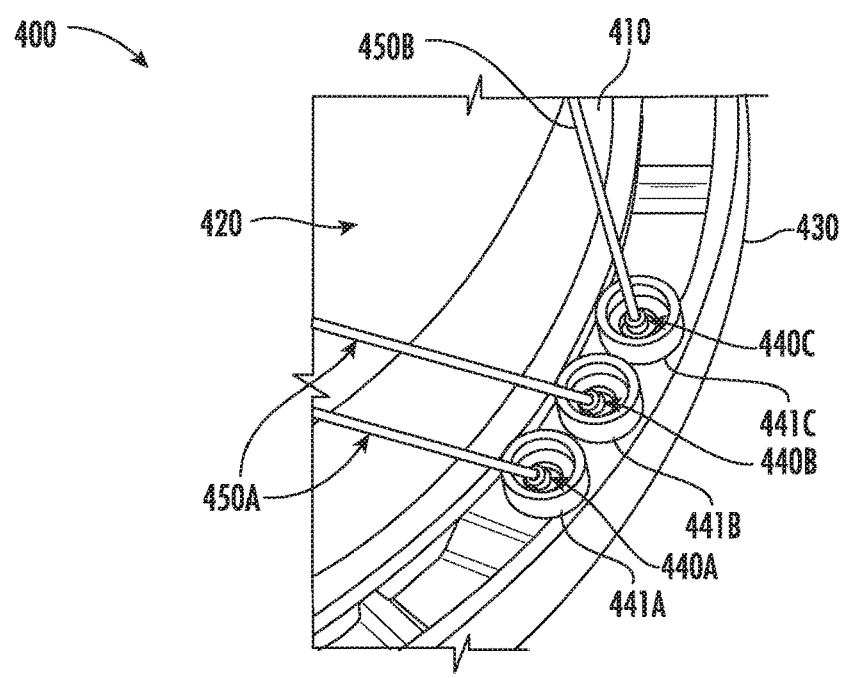
FIG. 4 depicts a portion of an example an example sensor according to example aspects of the present disclosure.

Referring now to FIG. 4, a portion of an example rotatable disc 430 of a sensor 400 according to example aspects of the present disclosure is depicted. The sensor 400 and components thereof can correspond to the sensor 300 and components thereof depicted in FIG. 3.

According to example aspects of the present disclosure, in some implementations, a plurality of nozzles 440 can be positioned on the rotatable disc 430. For example, as depicted in FIG. 4, three nozzles 440A-C are shown. The plurality of nozzles 440 can be configured to direct a flow of a pressurized fluid onto at least a portion of a curved lens 420.

Figure 5:
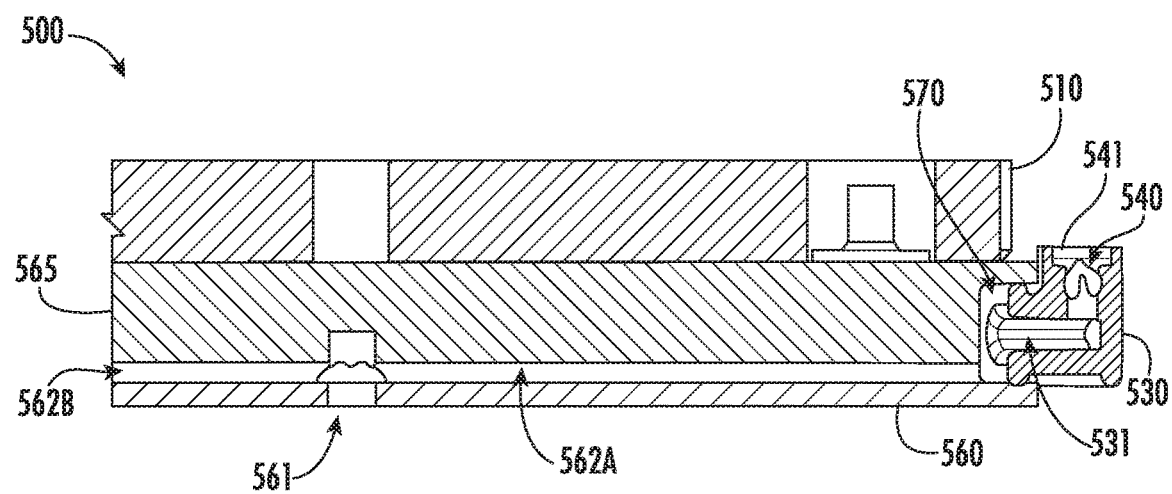
FIG. 5 depicts an example cutaway of an example sensor according to example aspects of the present disclosure.

For example, referring now to FIG. 5, a cutaway of a portion of a sensor 500 is depicted. As shown, a rotatable disc 530 is configured to rotate around the housing 510 within a channel 570. For example, the channel 570 can be circumferentially positioned around a base portion of the housing 510, as described herein. In some implementations, the channel 570 can be a "C" channel, as shown in FIG. 5. One or more nozzles 540 can be positioned on the rotatable disc 530. The sensor 500 and components thereof can correspond to, for example, the sensors 300/400 and components thereof depicted in FIGS. 3 and 4.

In some implementations, the base portion of the housing 510 can be constructed by mounting a base plate 560 to a bottom portion 565 of the housing 510. In some implementations, the base plate 560 can be constructed out of a metal, such as cast or milled aluminum. Other suitable materials can also be used. As shown, the base plate 560 can include an inlet 561 configured to receive a pressurized fluid. For example, the inlet 561 can be coupled to a pressurized fluid source via a connector (e.g., hose, tube, etc.). In some implementations, the inlet 561 can be positioned in a center of the base of the housing 510. In other implementations, the inlet 561 can be positioned in an off-center position of the base of the housing 510.

The sensor 500 can also include one or more fluid distribution ducts 562 configured to direct the pressurized fluid from the inlet 561 to the rotatable disc 530. In some implementations, a plurality of fluid distribution ducts 562 can be symmetrically positioned in the base of the housing 510. For example, a plurality of fluid distribution ducts 562 can be radially positioned from the inlet 561 to the channel 570. In some implementations in which a plurality of fluid distribution ducts 562 are included in a sensor 500, the plurality of fluid distribution ducts 562 can be configured to essentially distribute the pressurized fluid received at the inlet 561 to the channel 570 in an even manner. For example, the fluid distribution ducts 562 can be sized and positioned to provide an essentially even distribution of pressurized fluid to different portions of the channel 570, including implementations in which an inlet 561 is positioned in both a center and off-center position.

As the pressurized fluid is provided to the inlet 561, the sensor 500 can cause the pressurized fluid to flow from the inlet 561 through the one or more distribution ducts 562 to the rotatable disc 530 (e.g., via the channel 570). For example, as depicted, the rotatable disc 530 can be positioned within the channel 570. As the pressurized fluid flows into the channel 570, the pressurized fluid can be directed onto at least a portion of a curved lens (not shown) via a plurality of nozzles 540.

The rotatable disc 530 can be constructed out of any suitable material. For example, in some implementations, the rotatable disc 530 can manufactured out of a plastic material, such as injection molded, cast, and/or machined plastic. Such manufacturing techniques can allow for the rotatable disc 530 to be manufactured with a very low tolerance such that a very small gap exists between the rotatable disc 530 and the channel 570.

The rotatable disc 530 can include one or more fluid inlets 531 in fluid communication with the channel 570. As the pressurized fluid flows into the channel 570, the pressurized fluid can enter the rotatable disc 530 via the one or more fluid inlets 531. Further, the pressurized fluid can be directed to the nozzle(s) 540 via the one or more fluid inlets 531. For example, in some implementations, each nozzle 540 can have an associated fluid inlet 531. In some implementations, a single fluid inlet 531 can be configured to direct the pressurized fluid to a plurality of nozzles 540, such as a subset of nozzles 540.

The pressurized fluid flowing into the channel 570 and into the fluid inlets 531 can cause the rotatable disc 530 to be centered within the channel, thereby providing a lubricative effect between the rotatable disc 530 and the channel 570. For example, the rotatable disc 530 and the channel 570 can be manufactured with sufficiently tight tolerances such that there exists a small gap between the rotatable disc 530 and the channel 570. Further, the flow of the pressurized fluid can cause the rotatable disc 530 to glide within the channel 570. In some implementations, the materials chosen for the rotatable disc 530 and the adjacent portions of the channel 570 (e.g., portions of the housing 510) can be selected to further improve the gliding effect, such as by using low-friction materials.

As depicted in FIG. 5, in some implementations, the nozzle(s) 540 can be teardrop shaped nozzles. For example, the nozzle(s) 540 can include a teardrop shaped inner cavity, which can assist in increasing an exit velocity of the pressurized fluid. In some implementations, the nozzle(s) can be housed in a retaining ring 541 on the rotatable disc 530. For example, in some implementations, a retaining ring 541 can be injection molded plastic with a slightly narrower inner diameter than the outer diameter of the associated nozzle 540. In some implementations, the nozzle(s) 540 can be press fit into the rotatable disc 530. In some implementations, the nozzle(s) 540 can be inserted into the rotatable disc 530, and the retaining ring(s) 541 can be fastened to the rotatable disc 530 to house the associated nozzle(s) 540. An advantage provided by using retaining ring(s) 541 is that the nozzle(s) 540 can be independently movable within the respective retaining ring(s) 541.

For example, referring back to FIG. 4, in some implementations, the plurality of nozzles 440A-C can each be housed within a respective retaining ring 441A-C. this can allow for each nozzle to be angled to direct a flow of the pressurized fluid onto a desired portion of the sensor 400, such as a portion of a curved lens 420.

For example, in some implementations, the plurality of nozzles 440 can include one or more nozzles 440 angled in a first direction and one or more nozzles 440 angled in a second direction. For example, as depicted in FIG. 4, nozzles 440A-B are angled in a first direction, and nozzle 440C is angled in a second direction. The first two nozzles 440A-B can be angled in the first direction in order to direct a flow of a pressurized fluid 450A (e.g., a portion thereof) onto at least a portion of the curved lens 420. As the pressurized fluid 450 exits nozzles 440A-B, the force of the pressurized fluid 450 can cause the rotatable disc 430 to rotate around at least a portion of the housing 410.

In some implementations, the nozzle(s) 440 angled in the second direction (e.g., nozzle 440C) can be configured to direct the pressurized fluid 450B (e.g., a portion thereof) onto the curved lens 420 in a direction at least partially counter to the rotation of the rotatable disc 430. For example, the force of the pressurized fluid 450A exiting the nozzles 440A-B can cause the rotatable disc 430 to rotate, such as in a counter-clockwise direction. The force of the pressurized fluid 450B exiting the nozzle 440C, however, can be counter to the rotation of the rotatable disc 430, such as a force in a clockwise direction. Thus, the flow of the pressurized fluid 450B can slow the rotation of the rotatable disc 430. In this way, the rotational speed (e.g., RPM) of the rotatable disc 430 can be controlled. For example, by adjusting an angle of the nozzles 440A-C, a desired rotational speed can be achieved. This can aid in achieving a sufficient flow rate onto the curved lens 420 to delaminate debris.

Further, by angling one or more nozzles in a first direction (e.g., 440A-B) and one or more nozzles and a second direction (e.g., 440C), as the rotatable disc 430 rotates the flow of the pressurized fluid 450B from the nozzles in the second direction (e.g., 440C) can "back-sweep" the curved lens 420 to clean any debris in a blind spot of the pressurized flow 450A of the nozzles in the first direction (e.g., 440A-B). For example, blind spots can be caused by obstructions on the sensor, such as data and/or power connections positioned between the curved lens 420 and the base of the housing 410.

In some implementations, a sensor 400 can include a plurality of subsets of nozzles. For example, the nozzles 440A-C can correspond to a first subset of nozzles 440, and a second subset of nozzles 440 (not shown) can also be positioned on the rotatable disc 430. In some implementations, the subsets of nozzles 440 can be symmetrically balanced around the rotatable disc 430. For example, the second subset of nozzles 440 can be positioned on an opposite side of the rotatable disc 430 (e.g., 180 degrees around the rotatable disc 430). In other implementations, any number of subsets of nozzles can be symmetrically balanced around the rotatable disc 430. For example, three subsets of nozzles 440 can be included on a rotatable disc and can be positioned 120 degrees from each other, four subsets of nozzles 440 can be positioned 90 degrees from each other, etc.

In some implementations, one or more of the nozzle(s) 440 can be positioned at an angle of approximately 70 degrees. For example, the angle of a nozzle can be measured from zero to 180 degrees using the rotatable disc as the plane corresponding to zero and 180 degrees in a two-dimensional plane. Further, the nozzle(s) 440 can be rotated towards the curved lens 420 in a third dimension while maintaining this angle.

In some implementations, the rotatable disc 430 can be configured to continuously rotate about the housing 410 when the pressurized fluid is provided to the sensor 400. For example, in some implementations, a curved lens 420 can be an essentially cylindrical curved lens which generally wraps around an exterior of the housing 410 (e.g., a curved lens covering 180 degrees to 360 degrees around a housing 410). In such an implementation, it may be desirable for the rotatable disc 430 to continuously rotate around the housing 410 when the pressurized fluid is provided to the sensor 400 to delaminate debris around the entirety of the housing 410.

Figure 6:
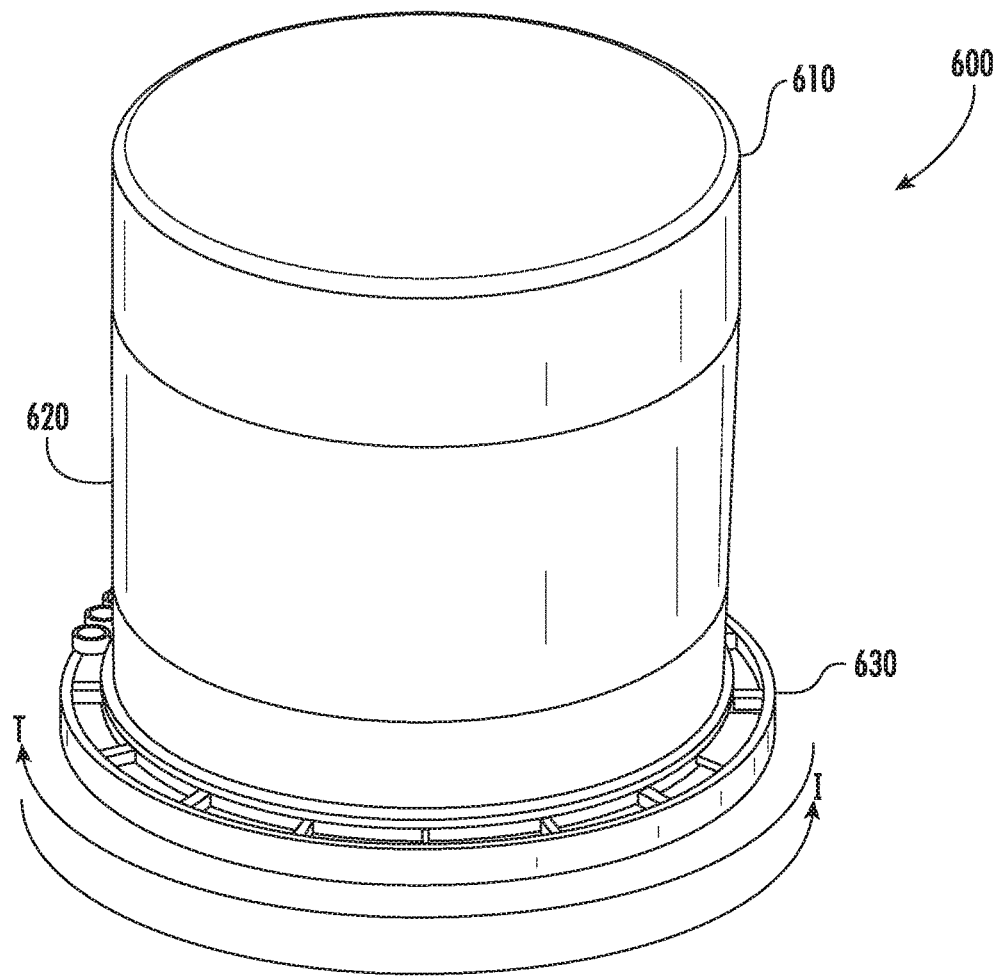
FIG. 6 depicts an example sensor with a counter-rotator according to example aspects of the present disclosure.

Referring now to FIG. 6, in some implementations, however, a rotatable disc 630 can be configured to rotate about a portion of a housing 610 from an initial position "I" to a terminal position "T" when the pressurized fluid is provided to the sensor 600. For example, in some implementations, a curved lens 620 of a sensor 600 may only need to be cleaned in a particular area. For example, sensor 600 may be a directional sensor, such as a sensor 600 in which the curved lens 620 may only include a forward-facing portion which needs to be cleaned.

According to additional example aspects of the present disclosure, in some implementations, the sensor 600 can include a counter-rotator configured to return the rotatable disc from the terminal position to the initial position when a flow of pressurized fluid to the sensor is ceased.

For example, in some implementations, the counter-rotator can be a spring (not shown). In various implementations, the spring can be, for example, a wound spring, torsion spring, extension spring, or other type of spring. In some implementations, the spring can be constructed out of metal, while in other implementations, the spring can be constructed out of any elastic material.

For example, a torsion spring can be positioned in a center of a housing 610 (e.g., circumscribing a center-positioned inlet), with a first portion of the torsion spring affixed to the housing 610 and a second portion of the torsion spring affixed to the rotatable disc. As the pressurized fluid flows through the sensor 600 and exits the rotatable disc 630, the force of the pressurized fluid can cause the rotatable disc 630 to rotate around the sensor 600 (e.g., from an initial position I to a terminal position T), as described herein. The rotation of the rotatable disc 630 can wind (e.g., load) the torsion spring. However, when the flow of the pressurized fluid is ceased, the potential energy stored in the torsion spring can cause the rotatable disc 630 to return from the terminal position T to the initial position I. Other counter-rotators can similarly be used, such as an extension springs, elastic materials (e.g. rubber bands), etc.

In some implementations, the rotatable disc 630 can be configured to rotate about a portion of the housing 610 in relation to a pressure of the pressurized fluid provided to the inlet. For example, the flow of the pressurized fluid through one or more nozzles on the rotatable disc 630 can increase the rotational force in relation to the pressure of the pressurized fluid provided to the sensor 600. Similarly, a counter-rotator, such as a torsion spring, can be configured to resist the rotational force exerted by the pressurized fluid in relation to the torque applied to the torsion spring. In this way, the angular rotation of the rotatable disc 630 can be controlled in relation to the pressure of the pressurized fluid. Thus, by varying the pressure of the pressurized fluid, the rotation of the rotatable disc 630 and the corresponding flow of the pressurized fluid onto the curved lens 620 can be controlled, thereby allowing for debris to be delaminated from a particular portion of the curved lens 620.

Figure 7:
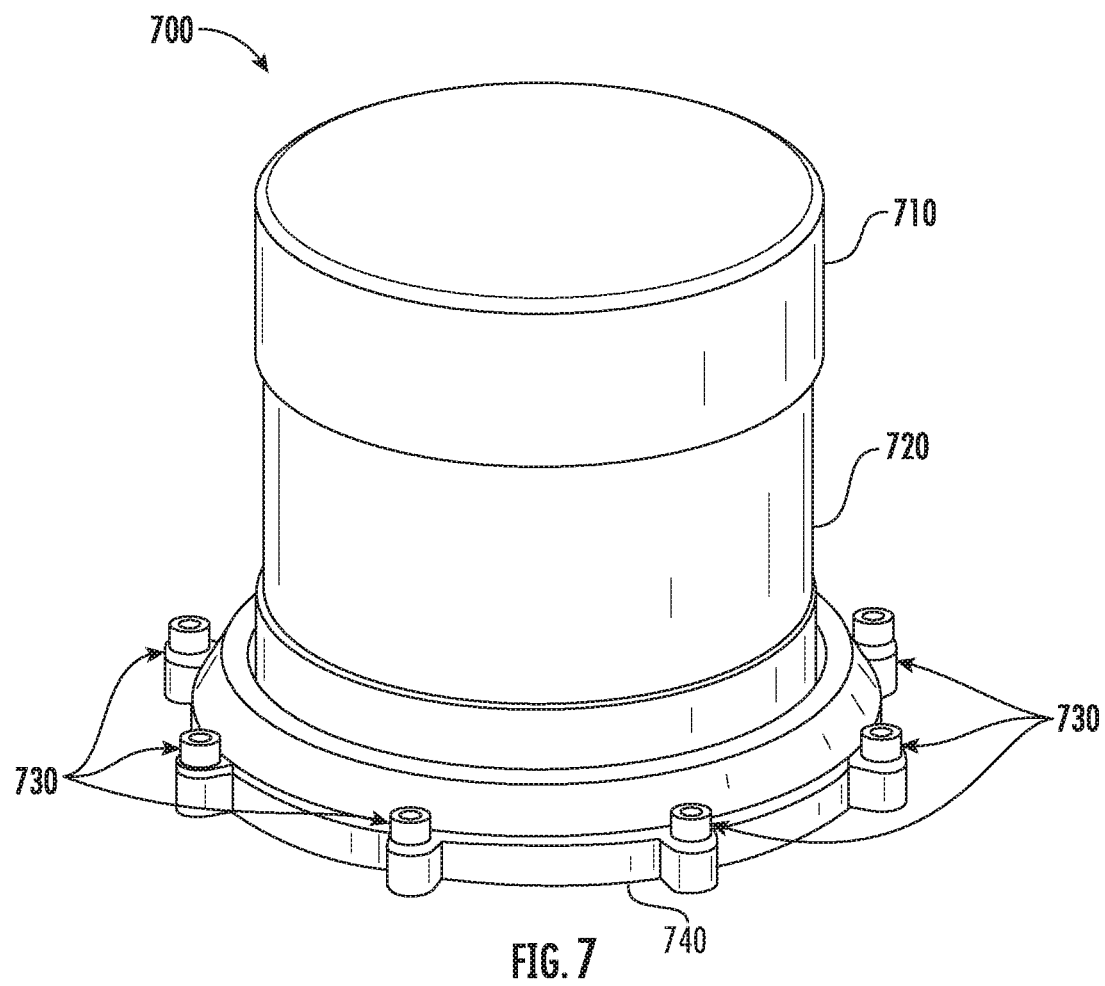
FIG. 7 depicts an example sensor according to example aspects of the present disclosure.

Referring now to FIG. 7, an example sensor 700 according to additional example aspects of the present disclosure is depicted. As shown, the sensor 700 can include a housing 710. For example, in some implementations, the housing 710 can be generally cylindrical. The housing 710 can be on an exterior portion of the sensor 700. In some implementations, one or more sensor components can be contained within the housing 710. For example, LIDAR components (e.g., spinning LIDAR, solid-state LIDAR) can be contained within the housing 710.

In some implementations, the housing 710 can include a curved lens 720. The curved lens 720 can wrap around at least a portion of the housing 710. For example, in some implementations, the curved lens 720 can be a generally cylindrical lens.

The housing 710 can be configured to be mounted on a vehicle, such as an autonomous vehicle 105 depicted in FIG. 1. For example, in various implementations, the housing 710 can include various mounting components (e.g., plates, brackets, mechanical fastener sockets, etc.) to allow for the housing 710 to be mounted on an exterior portion of the vehicle. In some implementations, the housing can include one or more data and/or power ports (not shown). For example, in some implementations, one or more data and/or power ports can be positioned between a curved lens 720 and a base portion of the housing 710. In some implementations, the base portion of the housing can be a baseplate 740.

The sensor 700 can also include a plurality of nozzles 730. The plurality of nozzles 730 can be positioned around an exterior of the housing 710. Each of the plurality of nozzles 730 can be configured to direct a flow of pressurized fluid onto at least a portion of the curved lens 720. For example, the plurality of nozzles 730 can be positioned around the baseplate 740.

Figure 8:
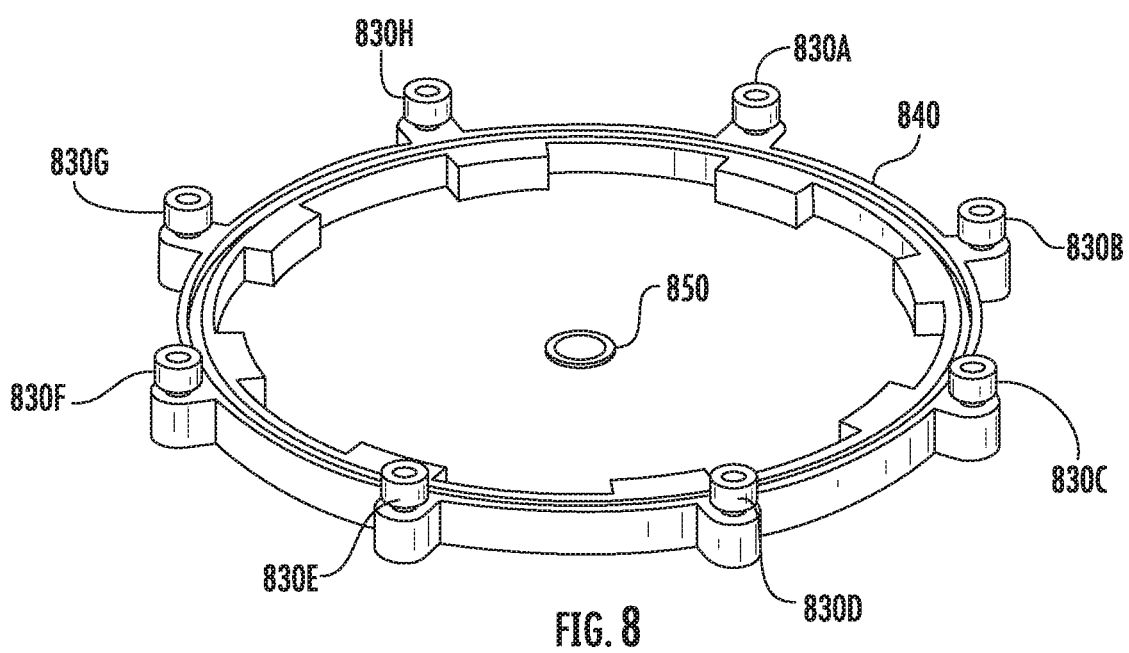
FIG. 8 depicts an example sensor baseplate according to example aspects of the present disclosure.

For example, referring now to FIG. 8, an example baseplate 840 of a sensor is depicted. The baseplate 840 can correspond to, for example, the baseplate 740 depicted in FIG. 7. As shown, a plurality of nozzles 830 are arranged on the baseplate 840. For example, as depicted, eight nozzles 830A-H are symmetrically positioned around the baseplate 840 by positioning the nozzles 830A-H every 45 degrees. Each nozzle 830 can have a respective portion of the baseplate 840 corresponding to 45-degree arc which is configured to direct a flow of pressurized fluid to each respective nozzle, where it can be directed onto at least a portion of a curved lens (not depicted). In other implementations, any number of nozzles can be positioned on a baseplate 840. Further, as will be discussed in greater detail with respect to FIGS. 10 and 11, each of the nozzles 830A-H can have an associated portion of the baseplate 840 which is configured to receive a flow of pressurized fluid.

Referring generally to FIGS. 7-8, the sensor 700 can further include an inlet 840 configured to receive a pressurized fluid. For example, the inlet 850 can be coupled to a pressurized fluid source via a connector (e.g., hose, tube, etc.). In some implementations, the inlet 850 can be positioned in a center of the baseplate 840, as depicted in FIG. 8. In other implementations, the inlet 850 can be positioned in an off-center position of the baseplate 840.

Figure 9:
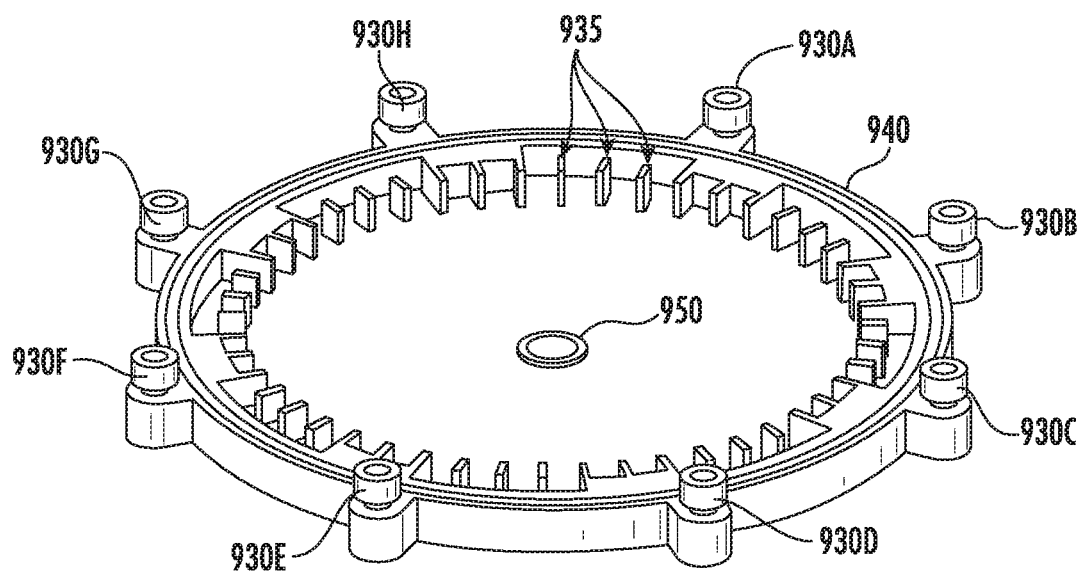
FIG. 9 depicts an example sensor base according to example aspects of the present disclosure.

Referring now to FIG. 9, another example baseplate 940 of a sensor is depicted. For example, the baseplate 940 can correspond to the baseplate 740 depicted in FIG. 7. Similar to the baseplate 840 depicted in FIG. 8, the baseplate 940 can include a plurality of nozzles 930A-H positioned around the baseplate and an inlet 950. As depicted in FIG. 9, each of the nozzles 930 can have an associated portion of the baseplate which is configured to receive a flow of pressurized fluid and provide the pressurized fluid to the associated nozzle. Additionally, as shown in FIG. 9, in some implementations, the respective portion of the baseplate 940 which is configured to direct the flow of the pressurized fluid to each respective nozzle 930 can include one or more fins 935. The fins 935 can assist in directing the pressurized fluid to the respective nozzle 930. For example, the fins can collect the pressurized fluid provided to a particular area of the baseplate 950 to an inlet (not shown) which directs the pressurized fluid to the associated nozzle 930.

Referring generally to FIGS. 7-9, a sensor, such as a sensor 700, can further include a rotatable fluid distributor positioned within the housing 710 of the sensor 700. The rotatable fluid distributor can be configured to receive the pressurized fluid from an inlet 850/950. Further, the rotatable fluid distributor can be configured to distribute the pressurized fluid received from the inlet to only a subset of the plurality of nozzles 730/830/930 at a given time.

Figure 10:
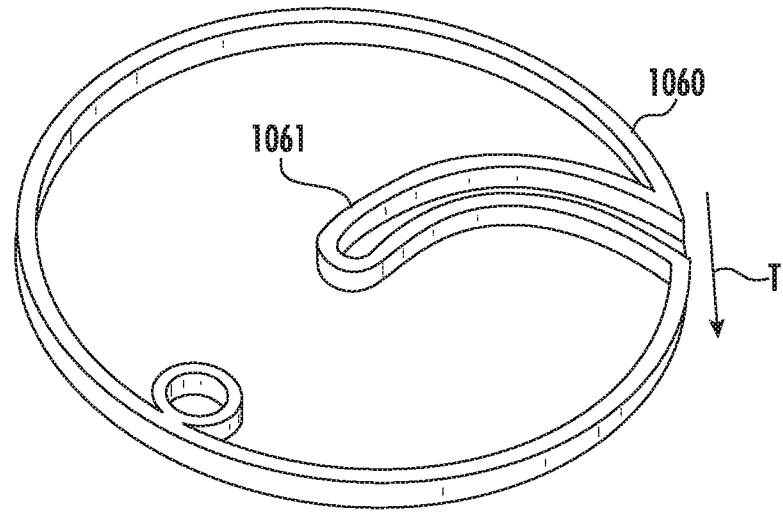
FIG. 10 depicts an example internal rotatable disc of an example sensor according to example aspects of the present disclosure.

For example, referring now to FIG. 10, in some implementations, the rotatable fluid distributor can be an internal rotatable disc 1060. The internal rotatable disc 1060 can receive the pressurized fluid from an inlet 850/950 and distribute the pressurized fluid to only a subset of the plurality of nozzles 730/830/930 by rotating within the housing 710.

For example, in some implementations, the internal rotatable disc 1060 can include a curved fluid duct 1061 configured to direct the flow of the pressurized fluid at least partially in a tangential direction. For example, as depicted in FIG. 10, the curved fluid duct 1061 curves from a center of the internal rotatable disc 1060 in a clockwise direction to an outer perimeter of the internal rotatable disc 1060. At the outer perimeter of the internal rotatable disc 1060, the curved fluid duct 1061 is oriented to direct a flow of a pressurized fluid at least partially in a tangential direction T. Stated differently, a vector describing the flow of a pressurized fluid as it exits the internal rotatable disc 1060 can include a tangential component (e.g., in a tangential direction) and a radial component (e.g., in a direction extending radially from a center of the internal rotatable disc 1060). The tangential component of the pressurized fluid flow can cause the internal rotatable disc 1060 to rotate.

Figure 11:
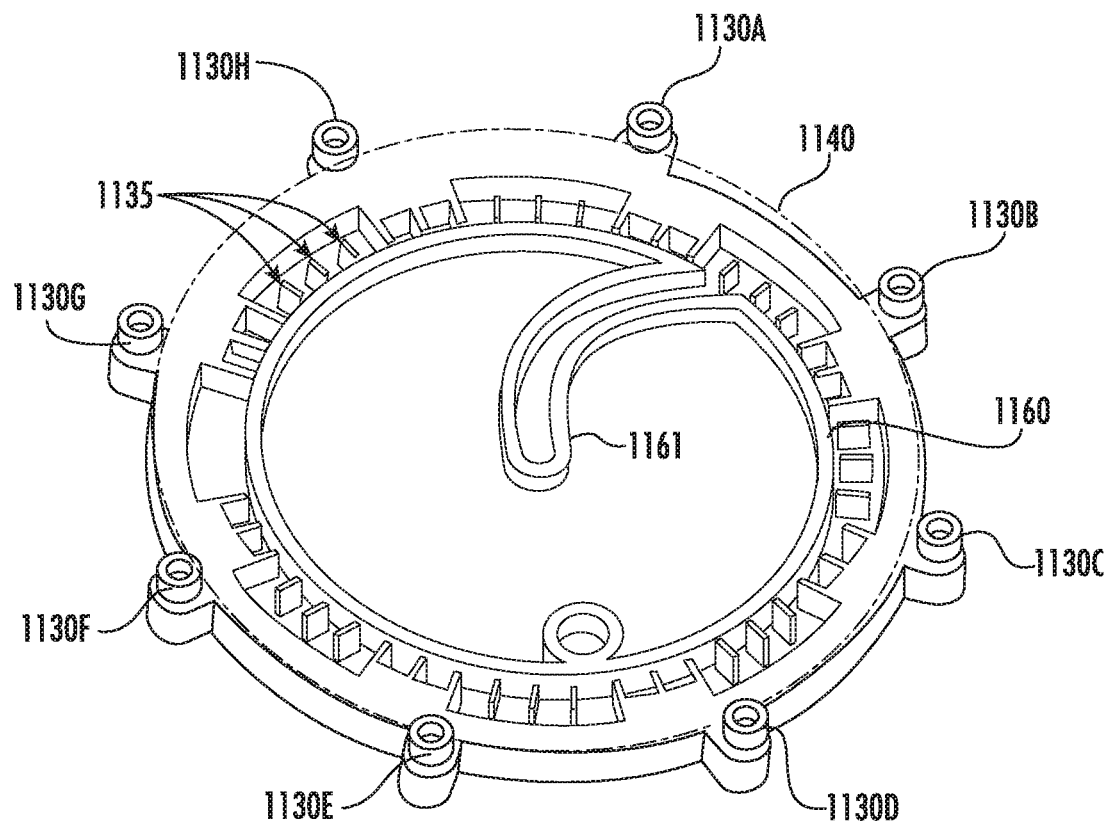
FIG. 11 depicts an example internal rotatable disc and example sensor base of an example sensor according to example aspects of the present disclosure.

For example, referring now to FIG. 11, an internal rotatable disc 1160 is positioned on a base plate 1140. As shown, the baseplate 1140 includes a plurality of nozzles 1130A-H similar to baseplates 840/940 depicted in FIGS. 8 and 9. Further, the respective portion of the baseplate 1140 for each nozzle 1130A-H includes a plurality of fins 1135, similar to the baseplate 940 depicted in FIG. 9.

The curved fluid duct 1161 of the internal rotatable disc 1160 can be configured to receive a pressurized fluid from an inlet of the base plate 1140 (e.g., an inlet 850/950 depicted FIGS. 8-9). As the pressurized fluid exits the curved fluid duct 1161, it will cause the internal rotatable disc 1160 to rotate, such as in a counterclockwise direction. As the internal rotatable disc 1160 rotates, the pressurized fluid will be distributed to a respective portion of the baseplate 1140 corresponding to one or more nozzles 1130. For example, as the internal rotatable disc 1160 rotates, the pressurized fluid will generally be provided to only one or two nozzles 1130 (e.g., a subset of the plurality of nozzles 1130) at any time.

In some implementations, a rotatable fluid distributor of a sensor can be a rotating cam. For example, referring now to FIG. 12, a rotating cam 1260 according to example aspects of the present disclosure is depicted. The rotating cam 1260 can be configured to receive a pressurized fluid, such as a pressurized fluid provided to an inlet of the sensor and distribute the pressurized fluid to a subset of nozzles.

Figure 12:
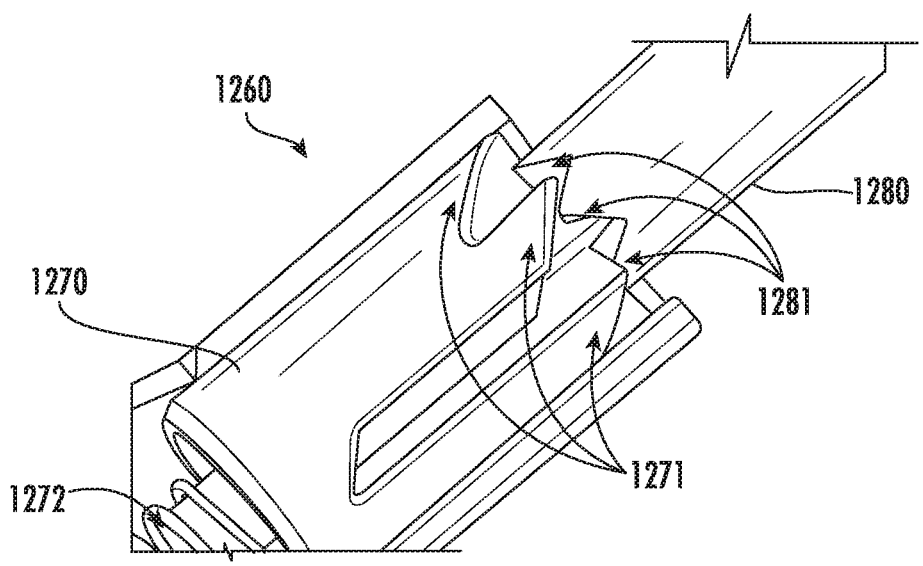
FIG. 12 depicts an example rotating cam of an example sensor according to example aspects of the present disclosure.

For example, the rotating cam 1260 can include a first portion 1270 and a second portion 1280 which can couple and decouple via a plurality of respective teeth 1271 and 1281 which engage with one another. In some implementations, the rotating cam 1260 can be a spring-loaded rotating cam, similar to a click pen mechanism. For example, as depicted in FIG. 12, the first portion 1270 can include a spring 1272 which can apply pressure to engage the teeth 1271 of the first portion 1270 with the teeth 1281 of the second portion 1280. As the teeth 1271/1281 engage and disengage, the portions 1270/1280 of the rotating cam 1260 can rotate with respect to one another. Other rotating cam 1260 implementations can also be used, such as a gravity-engaged rotating cam.

As a pressurized fluid is provided to the rotating cam 1260, the pressure of the pressurized fluid can cause the first portion 1270 to disengage with the second portion 1280, compressing the spring 1271. In some implementations, the disengagement of the portions 1270/1280 can cause the rotating cam 1260 to rotate, and in some implementations, the reengagement of the portions 1270/1280 can cause the rotating cam 1260 to rotate. As the flow of the pressurized fluid is ceased, the portions 1270/1280 can reengage due to the spring 1271 returning to an uncompressed state. The pressurized fluid can be "pulsed" by turning the flow of pressurized fluid on and off (e.g., by a flow control device), thereby causing the rotating cam 1260 to direct the flow of pressurized fluid to one or more nozzles (e.g., a subset of the plurality) at a time. Further, as the pressurized fluid is pulsed, the rotating cam 1260 can rotate to a different subset of nozzles. For example, each nozzle can have an associated fluid connector (e.g., a pipe, duct, tube, inlet, etc.) which receives the flow from the rotating cam 1260 when the rotating cam 1260 is engaged with the respective fluid connector. In this way, the rotating cam 1260 can act as an internal fluid distributor, which can distribute the flow of pressurized fluid to one or more nozzles of a sensor, such as in a sequential manner. Moreover, different pulse lengths, such as longer pulses vs. shorter pulses, can be used to increase a flow of pressurized fluid to a particular portion of a sensor.

Computing tasks, operations, and functions discussed herein as being performed at one computing system herein can instead be performed by another computing system, and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A sensor comprising:
    a housing, the housing comprising a curved lens;
    a base plate mounted to a base of the housing;
    an inlet defined by the base plate, the inlet configured to receive a flow of a pressurized fluid;
    a rotatable disc positioned on the base plate, the rotatable disc defining a curved fluid duct configured to receive the flow of the pressurized fluid from the inlet, the curved fluid duct extending from a location on the rotatable disc corresponding to the inlet defined by the base plate to a perimeter of the rotatable disc, the flow of the pressurized fluid exits the curved fluid duct at the perimeter of the rotatable disc and causes the rotatable disc to rotate; and
    a plurality of nozzles positioned on the base plate, the plurality of nozzles respectively configured to direct the flow of the pressurized fluid exiting the curved fluid duct onto at least a portion of the curved lens;
    wherein the rotatable disc is configured to distribute the flow of the pressurized fluid to only a subset of the plurality of nozzles at a time.

2. The sensor of claim 1, wherein the curved fluid duct is configured to direct the flow of the pressurized fluid at least partially in a tangential direction.

3. The sensor of claim 1, wherein the rotatable disc is configured to rotate due to the flow of the pressurized fluid to direct the flow of the pressurized fluid from the curved fluid duct to the subset of the plurality of nozzles.

4. The sensor of claim 1, wherein the base plate comprises one or more fins associated with the subset of the plurality of nozzles, the one or more fins configured to receive the flow of the pressurized fluid from the curved fluid duct and further configured to direct the flow of the pressurized fluid to the subset of the plurality of nozzles.

5. The sensor of claim 1, wherein the plurality of nozzles is symmetrically spaced apart from one another on the base plate.

6. The sensor of claim 1, wherein one or more of the nozzles of the plurality comprise one or more teardrop shaped nozzles.

7. The sensor of claim 1, wherein the sensor comprises a spinning LIDAR sensor or a solid-state LIDAR sensor.

8. The sensor of claim 1, wherein the inlet is positioned in a center of the base plate.

9. The sensor of claim 1, wherein the pressurized fluid comprises a gaseous fluid or a liquid fluid.

10. The sensor of claim 1, wherein the plurality of nozzles are positioned at a periphery of the base plate.

11. The sensor of claim 1, wherein the rotatable disc is rotatable relative to the base plate in a first direction and a second direction that is different than the first direction.

12. The sensor of claim 1, wherein the plurality of nozzles are respectively oriented at the same angle.

13. A sensor cleaning system, comprising:
    a pressurized fluid source; and
    a sensor comprising:
        a housing, the housing comprising a curved lens;
        A base plate mounted to a base of the housing;
        an inlet defined by the base plate, the inlet configured to receive a flow of a pressurized fluid from the pressurized fluid source;
        a rotatable disc positioned on the base plate, the rotatable disc defining a curved fluid duct configured to receive the flow of the pressurized fluid from the inlet, the curved fluid duct extending from a location on the rotatable disc corresponding to the inlet defined by the base plate to a perimeter of the rotatable disc, the flow of the pressurized fluid exits the curved fluid duct at the perimeter of the rotatable disc and causes the rotatable disc to rotate; and
        a plurality of nozzles positioned on the base plate, the plurality of nozzles respectively configured to direct the flow of the pressurized fluid exiting the curved fluid duct onto at least a portion of the curved lens;
        wherein the rotatable disc is configured to distribute the flow of the pressurized fluid to only a subset of the plurality of nozzles at a time through the curved fluid duct.

14. The sensor cleaning system of claim 13, wherein the base plate is configured to direct the flow of the pressurized fluid exiting the curved fluid duct of the rotatable disc to the subset of the plurality of nozzles.

15. An autonomous vehicle, comprising:
a pressurized fluid source; and
a sensor comprising:
- a housing, the housing comprising a curved lens;
- a base plate mounted to a base of the housing;
- an inlet defined by the base plate, the inlet configured to receive a flow of a pressurized fluid from the pressurized fluid source;
- a rotatable disc positioned on the base plate, the rotatable
disc defining a curved fluid duct configured to receive the flow of the pressurized fluid from the inlet, the curved fluid duct extending from a location on the rotatable disc corresponding to the inlet defined by the base plate to a perimeter of the rotatable disc, the flow of the pressurized fluid exits the curved fluid duct at the perimeter of the rotatable disc and causes the rotatable disc to rotate; and
  - a plurality of nozzles positioned on the base plate, the plurality of nozzles respectively configured to direct the flow of the pressurized fluid exiting the curved fluid duct onto at least a portion of the curved lens;
  - wherein the rotatable disc is configured to distribute the flow of the pressurized fluid to only a subset of the plurality of nozzles at a time.

16. The autonomous vehicle of claim 15, wherein the sensor is mounted on a side of the autonomous vehicle.

17. The autonomous vehicle of claim 15, wherein the sensor comprises a spinning LIDAR sensor or a solid-state LIDAR sensor.

18. The autonomous vehicle of claim 15, wherein the pressurized fluid comprises a liquid.

\* \* \* \* \*